(12) United States Patent
Khan

(10) Patent No.: US 10,476,837 B2
(45) Date of Patent: Nov. 12, 2019

(54) IPV4 ADDRESSING SCHEMA DESIGN METHODOLOGY USING A VISUAL INTERACTIVE TOOL

(71) Applicant: Saudi Arabian Oil Company, Dhahran (SA)

(72) Inventor: Atif Zaman Khan, Monmouth Junction, NJ (US)

(73) Assignee: Saudi Arabian Oil Company, Dhahran (SA)

( * ) Notice: Subject to any disclaimer, the term of this patent is extended or adjusted under 35 U.S.C. 154(b) by 27 days.

(21) Appl. No.: 15/626,906

(22) Filed: Jun. 19, 2017

(65) Prior Publication Data

US 2018/0367501 A1 Dec. 20, 2018

(51) Int. Cl.
*H04L 29/12* (2006.01)
*H04L 12/24* (2006.01)
*H04L 29/08* (2006.01)

(52) U.S. Cl.
CPC .......... *H04L 61/2007* (2013.01); *H04L 41/22* (2013.01); *H04L 61/10* (2013.01); *H04L 67/025* (2013.01)

(58) Field of Classification Search
CPC ........... H04L 29/12066; H04L 61/1511; H04L 29/12009; H04L 29/06; H04L 29/08072
See application file for complete search history.

(56) References Cited

U.S. PATENT DOCUMENTS

| 6,031,528 | A | 2/2000 | Langfahl, Jr. | |
|---|---|---|---|---|
| 6,690,659 | B1 | 2/2004 | Ahmed et al. | |
| 6,941,359 | B1 | 9/2005 | Beaudoin et al. | |
| 7,027,055 | B2 | 4/2006 | Anderson et al. | |
| 7,886,033 | B2 | 2/2011 | Hopmann et al. | |
| 7,925,729 | B2 | 4/2011 | Bush et al. | |
| 9,069,774 | B1* | 6/2015 | Ansari | G06F 11/3006 |
| 2001/0040532 | A1* | 11/2001 | Yasuda | H04N 7/142 |
| | | | | 345/1.1 |
| 2004/0030741 | A1 | 2/2004 | Wolton et al. | |
| 2004/0031059 | A1 | 2/2004 | Bialk et al. | |
| 2004/0056888 | A1* | 3/2004 | Fujinuma | H04L 29/06 |
| | | | | 715/736 |
| 2005/0038884 | A1 | 2/2005 | Boylan et al. | |
| 2005/0149626 | A1* | 7/2005 | Manchester | H04L 41/0213 |
| | | | | 709/220 |

(Continued)

OTHER PUBLICATIONS

International Search Report and Written Opinion issued in International Application No. PCT/US2018/037224 dated Sep. 5, 2018, 12 pages.

(Continued)

*Primary Examiner* — Abdullahi E Salad
(74) *Attorney, Agent, or Firm* — Fish & Richardson P.C.

(57) ABSTRACT

A schema is generated from a start IP address, a mask, and a desired level. The schema defines IPv4 addresses for nodes in the schema. The nodes represent addressable computer devices in an organization. For each node and using the generated schema, an IP address, a mask, and a net are computed. The schema is stored. Information for presenting the schema is provided for use in a user interface. The information includes information for displaying visualizations of groups of nodes in the schema and instructions for listening for events based on user interactions that modify node information for nodes in the schema. Information for modified nodes is received in the user interface and generated from triggered events. The stored schema is updated using the information for the modified nodes.

20 Claims, 17 Drawing Sheets

(56) References Cited

U.S. PATENT DOCUMENTS

| | | | |
|---|---|---|---|
| 2008/0052384 A1 | 2/2008 | Marl et al. | |
| 2008/0201488 A1* | 8/2008 | Kenner | H04L 67/1008 709/245 |
| 2009/0037847 A1 | 2/2009 | Achtermann et al. | |
| 2009/0125488 A1* | 5/2009 | Vala | G06F 17/30241 |
| 2009/0222547 A1* | 9/2009 | Boylan | H04L 29/12009 709/223 |
| 2012/0290694 A9 | 11/2012 | Marl et al. | |
| 2013/0321458 A1* | 12/2013 | Miserendino | H04L 41/0883 345/629 |
| 2014/0090053 A1* | 3/2014 | Simske | H04L 63/105 726/22 |
| 2014/0310262 A1* | 10/2014 | Feinberg | G06F 17/30312 707/722 |
| 2017/0193016 A1* | 7/2017 | Kulkarni | G06F 17/30604 |

OTHER PUBLICATIONS

Aflaki, James: "A Complete Solution to IPV4 Addressing", Allied Academies International Conference, Reno, 2008; Proceedings of the Allied Academies, vol. 15, No. 2, 4 pages.

Bragg, Arnold W.: Network Designs, "Which Network Design Tool Is Right for You?", IT Pro, Sep./Oct. 2000, 13 pages.

Online IP CIDR/VLSM Supernet Calculator; http://www.subnet-calculator.com/cidr.php retrieved on Dec. 27, 2016, 2 pages.

IP Subnet Calculator—SubnetOnline.com; http://www.subnetonline.com/pages/subnet-calculators/ip-subnet-calculator.php retrieved on Dec. 27, 2016, 1 page.

Lucidchart; Network Diagram Software & Network Design Tools; https://www.lucidchart.com/pages/examples/network_diagram_software; retrieved on Dec. 27, 2016, 4 pages.

Subnet Calculator—IP Location; Subnet Calculator (IPv4 Only); https://www.iplocation.net/subnet-calculator, retrieved on Dec. 27, 2016, 5 pages.

Network Calculators; http:www.subnetmask.info/; retrieved on Dec. 27, 2016, 2 pages.

Visual Subnet Calculator; http://www.davidc.net/sites/default/subnets/subnets.html; retrieved on Dec. 27, 2016, 1 page.

Subnet Calculator—TunnelsUP; https://www.tunnelsup.com/subnet-calculator/; retrieved on Dec. 27, 2016, 4 pages.

Visual Subnet Calculator-davidc.net, Oct. 22, 2002; http://davidc.net/networking/visual-subnet-calculator; retrieved on Dec. 27, 2016, 1 page.

* cited by examiner

FIG. 3B
```
{
    "Name": "Custom",
    "Datatime": "10/26/2016, 9:15:50 AM",
    "show_labels": false,
    "show_nets": false,
    "grid": false,
    "dark": false,
    "layout": false,
    "snap": false,
    "Nodes": [
        {
            "id": 0,
            "key": 0,
            "Label": "",
            "color2": "#ADD8E6",
            "color": "#ADD8E6",
            "text_color": "black",
            "Content": "192.0.0.0/8",
            "ToolTip": "64K /24 Nets",
            "everExpanded": true,
            "isTreeExpanded": true,
            "loc": "0 97.9842712474619"
        },
```

- 404a  10.0.0.0/10  AMERICAS
- 404b  10.64.0.0/10  EUROPE
- 404c  10.128.0.0/10  AFRICA/MIDDLE EAST
- 404d  10.192.0.0/10  ASIA PACIFIC

406: 10.0.0.0/8
10.0.0.0/9
10.128.0.0/9

400, 402

IPV4 ADDRESSING SCHEMA DESIGN METHODOLOGY USING A VISUAL INTERACTIVE TOOL

BACKGROUND

Optimal and hierarchical Internet Protocol version 4 (IPv4) address schema design for an enterprise network is typically an arduous manual task. For example, some existing solutions may use spreadsheets or other IPv4 calculator programs. Due to the manual nature of the process, common errors can result in a non-optimal address schema design that cannot be summarized, such as by using simple ranges. In general, Internet Protocol (IP) address design is not considered a requirement, as most networks are already assigned IP addresses. Further, when a network size grows, IP addresses are assigned on an as-needed basis from available private address space.

Presently, IP address design for a network is typically performed by selecting up a random private address space defined by the Internet Assigned Numbers Authority (IANA) and assigning addresses to networks. Existing methodologies for assigning addresses based on geographic, regional, location, and office types are typically manual and non-systematic. There are various management tools for IP addresses, but no design tool exists that allows a user to optimally design IP addresses for: 1) an existing network that requires scaling; 2) a greenfield new company network design; and 3) companies integrating and requiring re-IP of their networks. The deficiency of existing ways to design network IPs is non-optimal, non-homogeneous, and non-hierarchical, which can result in the creation of a non-optimal routing table and unnecessary resource utilization. Another significant deficiency is the probability of non-contiguous addresses advertised from various locations/offices to the core network.

SUMMARY

The present disclosure describes an Internet Protocol version 4 (IPv4) schema design methodology using a visual interactive tool.

In an implementation, a computer-implemented method includes: generating a schema from a start IP address, a mask, and a desired level, the schema defining IPv4 addresses for nodes in the schema, the nodes representing addressable computer devices in an organization; computing, for each node and using the generated schema, an IP address, a mask, and a net; storing the schema; providing, for use in a user interface: information for presenting the schema, including information for displaying visualizations of groups of nodes in the schema; and instructions for listening for events based on user interactions that modify node information for nodes in the schema; receiving, in the user interface and generated from triggered events, information for modified nodes; and updating the stored schema using the information for the modified nodes.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/ the instructions stored on the non-transitory, computer-readable medium.

The subject matter described in this specification can be implemented in particular implementations so as to realize one or more of the following advantages. First, a methodology is provided for allocating IP addresses methodically while avoiding non-structured IP addressing in an enterprise network. Second, a visual software tool supports a dynamic methodology for the IP address schema design for enterprise networks. Third, summarizable and hierarchical IP subnet addressing can be designed. Other advantages will be apparent to those of ordinary skill in the art.

The details of one or more implementations of the subject matter of this specification are set forth in the accompanying drawings and the description. Other features, aspects, and advantages of the subject matter will become apparent from the description, the drawings, and the claims.

DESCRIPTION OF DRAWINGS

FIG. 3B lists example statements providing input to the example user interface, according to an implementation.

FIGS. 4-6 are diagrams illustrating example IP address global allocations by global geographic territory, according to an implementation.

Like reference numbers and designations in the various drawings indicate like elements.

DETAILED DESCRIPTION

Figure 1:
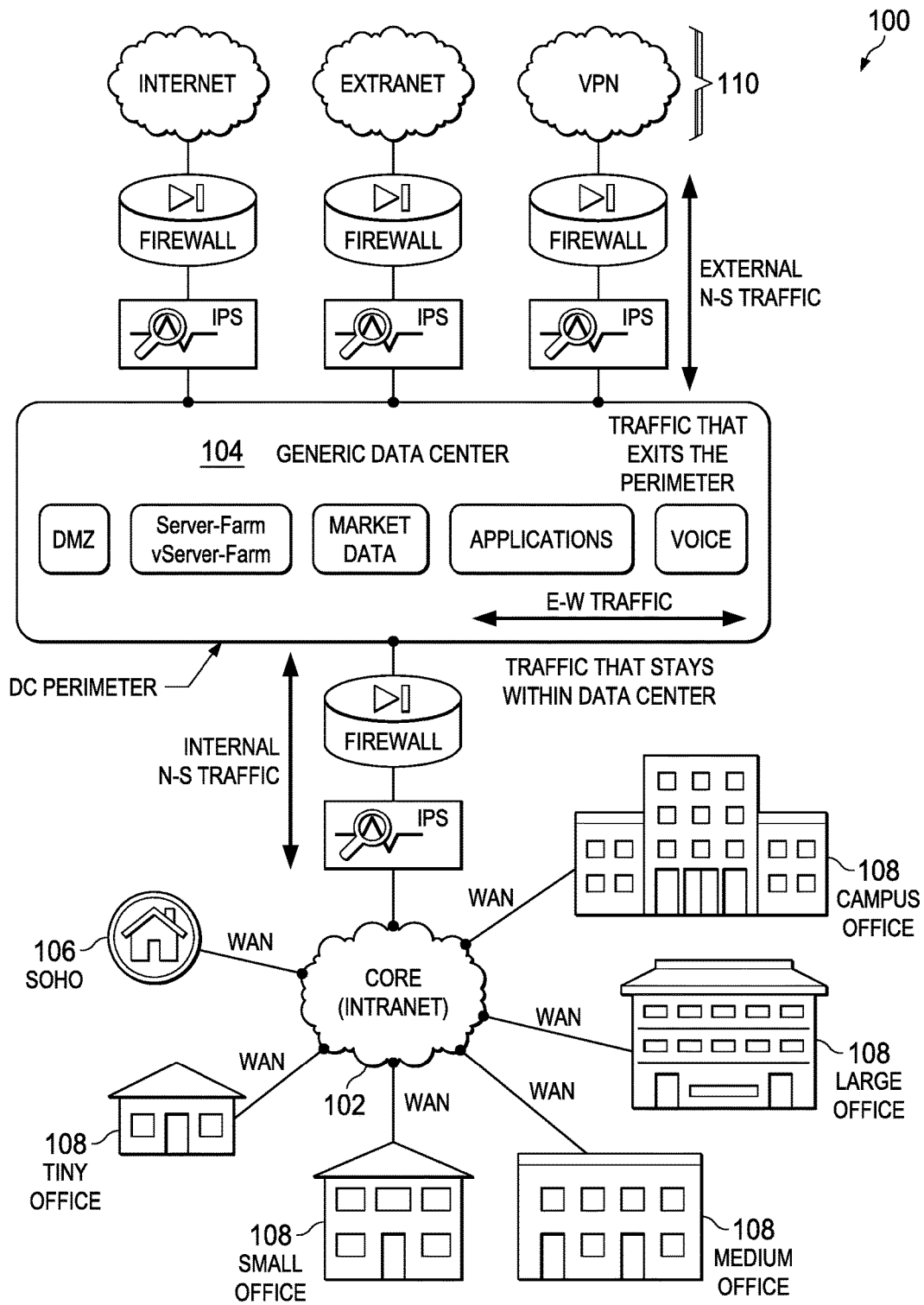
FIG. 1 is a block diagram of an example enterprise network topology, according to an implementation.

The following detailed description describes an Internet Protocol version 4 (IPv4) schema design methodology using a visual interactive tool, including illustrating the use of a web-based (or otherwise hosted) visual software tool for generating a schema design pictorially for a network, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

The described methodology is simple, methodic, and easily scalable, and recommends the use of RFC-1918 reserved Internet Protocol (IP) blocks in such a way that the IPv4 addresses are optimally assigned to each type of network (for example, data networks, management networks, and test networks) in a network (for example, a global enterprise network). Specifically, RFC-1918 refers to standards set by Request for Comments (RFC), number 1918, for IPv4 address spaces for use in the Internet community. This includes reserving IP addresses, for example, in ranges 10.0.0.0 through 10.255.255.255 (10/8 prefix) that cannot be routed on the Internet. The methodology assures an optimal route table at geographical and regional locations. The representation of the design methodology in pictorial and visual format is obtained using the tool that conveniently displays expanded IPv4 addresses for specific subnets. The tool allows for color-coded images, node labeling, and export options in multiple formats. The images produced by the tool can help visualize the hierarchical addressing and optimal summarization for each address allocation. The tool can be used for a "greenfield" network design (for example, the installation and configuration of a network where none existed before) as well as existing brownfield network designs. Another advantage of the methodology and visual tool is that, compared to existing visualization and simulation applications that run on the client machine and require an installation process, the browser-based visualization tool has potential to fulfill the dream of quick and easy custom visualization on PCs and smart devices. An example of an IPv4 address schema design for an enterprise data center network using the tool is provided.

In some implementations, criteria for determining characteristics of an optimal design can include well-known best practices such as: 1) smallest route table (for example, the least number of prefix entries); 2) hierarchical addressing; and 3) prefixes that are summarizable to reduce complexity of the route table. Optimality in network routing table can refer to the least possible number of route entries in a route table that covers all networks of a given topology.

In some implementations, an example non-optimal routing table would be a situation in which a router has multiple individual prefixes of a summary address in its routing table from the same next-hop router. A single summarized route entry that contains all individual routes of the summary is ideal, and can significantly reduce the size of the routing table. This can also reduce route processing and improve performance (for example, based on the size of the route table).

An IP address typically uniquely identifies each device in an IP-based computer network. For large enterprises, network engineers typically layout an IP addressing plan. Otherwise, a process of allocating, recycling, and documenting IP addresses and subnets in the network can become confusing very quickly. A more structured design can allow a system to support additional services in the future, including unified communications, wireless access, and enhanced network security. This can support the increasing requirement for custom on-demand high performance visualization and simulation for networking, engineering, medical, scientific, and industrial applications. A browser-based interactive visualizer remains an unheard concept despite all advancements in computer and software technology.

This disclosure presents a structured and hierarchical IPv4 addressing design methodology using an interactive visual software tool, for example, a system called "Visual-IPv4," which can be used to design both Unicast and Multicast IP schemas for any sized network. The tool is a lightweight application for structured IPv4 design that can allow quick and powerful web-based custom visualization and drawings on browsers and smart devices without the need for looking into documents. The tool utilizes latest web technologies, including Hyper-Text Markup Language (HTML) 5 and JAVASCRIPT, to visualize any IPv4 schema on web browsers and smart devices, and the tool is particularly beneficial for large enterprise and data center network IPv4 address design. The tool also provides a pictorial presentation of the carved subnets and supernet boundaries. An example of an IPv4 address schema design for an enterprise data center is presented to illustrate the methodology and the features of the tool.

Enterprise network IPv4 addressing can typically require careful planning and design. It is particularly important to make sure that the IP addressing is structured and hierarchical when designed, such that, for example, a resulting routing table is optimized, scaling is possible, and IPv4 addresses are not wasted. Most enterprise networks are already in production, and if their addressing has not been carefully designed, optimization in routing is not possible. However, as enterprise networks expand and add more campus sites, offices, and data centers, newer IPv4 addressing can be done carefully.

For a greenfield network design, the tasks of IP addressing, virtual local area network (VLAN) numbering, and VLAN assignment can be significant, challenging, and cannot be easily reversed.

The described methodology is adaptable for larger or smaller networks, different types of networks, different addressing schemes, different regions, different numbers of users, different servers, and different types of networks. For example, the methodology can provide a visual display, such as in a user interface or in a spreadsheet, that includes all addresses within a given range of a subnet from smaller masks to higher masks as entered in the range. The user can then decide which summary address to use for a region, location, or site. Optimality can be considered to be achieved when a smaller mask is selected for region, the next level of mask is selected for a location, and the highest mask is selected for the site. For example, if Americas user space is selected as 10.0.0.0/10, and Americas is divided into four regions, each with a /12 subnet, then each of those regions will have a summarized /12 subnet to allocate to the core network. Within the regions, a design of addresses can include one /15 for data center addressing, one /15 for user-data networks, one /15 for user-Wifi networks, and one /15 for user-VoIP networks. In this way, all groupings, including data center, user-data, user-Wifi, user-VoIP addressing, can be clearly delineable. Further, once allocated to its corresponding higher level, the address ranges can be clearly hierarchical and are summarizable.

FIG. 1 is a block diagram of an example enterprise network topology 100, according to an implementation. The standard enterprise network topology 100 is shown as having a core 102 connected to the company data centers 104, a headquarters office 106, multiple campus offices 108, and other office locations of various sizes. The datacenter connectivity to external networks 110 is also shown. This enterprise network topology 100 can be a global network with multiple sites connected to the core 102 using Multi-Protocol Label Switching (MPLS) or point-to-point (P2P) circuits. A carefully-planned IPv4 design is necessary, that identifies all subnets, VLANs, and reservations for a scalable design. The following sections provide a simplified design methodology with an example of a global IP addressing design for an enterprise network.

Generally, an IPv4-based network must meet particular requirements. First, a unique network number can be assigned by either an Internet service provider (ISP), an Internet registry (IR), or registered by the Internet Assigned Numbers Authority (IANA). Second, unique IPv4 addresses can be assigned for every network system interface. Third, a network mask can be used.

An IPv4 address is a 32-bit number that uniquely identifies a network interface on a system and is written in decimal digits, divided into four 8-bit fields that are separated by periods. Each 8-bit field represents a byte of the IPv4 address. This form of representing the bytes of an IPv4 address is often referred to as the dotted-decimal format.

Global IPv4 addresses are $2^{32}$ (4×8-bit octets) or about 4.29 billion. The addresses include network, broadcast, and host addresses and are divided into private, test, multicast, reserved, and public spaces. About 17.891 million of the public addresses are used for private networks, per RFC-1918 for IPv4.

The private IP addresses are used inside a company or behind a firewall to cater to company needs and to not waste public IP addresses. RFC-1918 reserves addresses for private use in three categories as shown in Table 1:

TABLE 1

Reserved Addresses

| Address | Block | Range | Hosts |
| --- | --- | --- | --- |
| 10.0.0.0/8 | 24-bit | 10.0.0.0-10.255.255.255 | 16M |
| 172.16.0.0/12 | 20-bit | 172.16.0.0-172.31.255.255 | 1M |
| 192.168.0.0/16 | 16-bit | 192.168.0.0-192.168.255.255 | 64K |

With the previous address reservations, many large enterprises will need a relatively small block of addresses from the globally unique IPv4 public address space and can benefit from the increased flexibility provided by a relatively large private address space for their internal use. However, use of private addressing requires that an organization renumber part or all of its enterprise network, as its connectivity requirements change over time. For an enterprise, the three reserved private IPv4 address spaces can be used for all of its offices and data centers addressing needs. However, the addresses will not be structured or optimal. Therefore, there is a need to use a structured and optimal design of IPv4 addresses.

There are many tools for IP address management and design. For example, tools such as INFOBLOX can be used to maintain a management database of all IP addresses. IP management tools can include capabilities and functions for keeping track of IP address assignments to servers, personal computers (PCs), and other infrastructure services such as Domain Name Services (DNS) and Dynamic Host Control Protocol (DHCP). However, there is no IP address "design" tool available (outside of this disclosure). The function, capability, and advantages of such tools are significant over management tools, as the tools can provide design of a structured and hierarchical IP addressing schema for networks. For an enterprise company with global presence, for example, all private IP addressing can be done such that the blocks are contiguous, summarizable, and scalable within each region. At the present time, all IP address assignments and design are done using worksheets or spreadsheets and are manually maintained. The tool described in this disclosure can help resolve the issue of un-structured IPv4 address assignments and design, and can also provide a visual representation of an IPv4 schema.

State-of-the-art web technologies can be used to design and implement an interactive, mobile-friendly IPv4 schema design and visualization application, or the system called "Visual-IPv4." In some implementations, the following third-party libraries and frameworks can be employed. HTML5 can be used, for example, along with a larger set of technologies, including Cascading Style Sheets (CSS) 3, that allow more diverse and powerful Web sites and applications. Libraries such as GOJS or some other JAVASCRIPT library can be used for implementing interactive diagrams, such as flowcharts, organizational hierarchies, trees, and other complex displays. Bootstrap can be used, and is a popular HTML, CSS, and JAVASCRIPT framework for developing responsive, mobile first projects on the web. The system can use the GOJS library, for example, for drawing. GOJS is a JAVASCRIPT library that can be used for implementing interactive diagrams and visualizations on modern web browsers and platforms. GOJS can allow easy construction of custom and complex diagrams of nodes, links, and groups with customizable templates and layouts. The library can provide rich features such as drag-and-drop, copy-and-paste, in-place text editing, tool-tips, templates, data binding and models, transactional state and undo management, palettes, event handlers, commands, and an extensible tool system for real-time custom operations on the diagram. GOJS does not depend on any JAVASCRIPT libraries or frameworks, so it should work with any web framework or with no framework at all. In summary, GOJS is a powerful and flexible system permitting simple development of interactive, drill-down, editable drawings such as complex trees and flow charts. Other visual application tools can be used.

Figure 2:
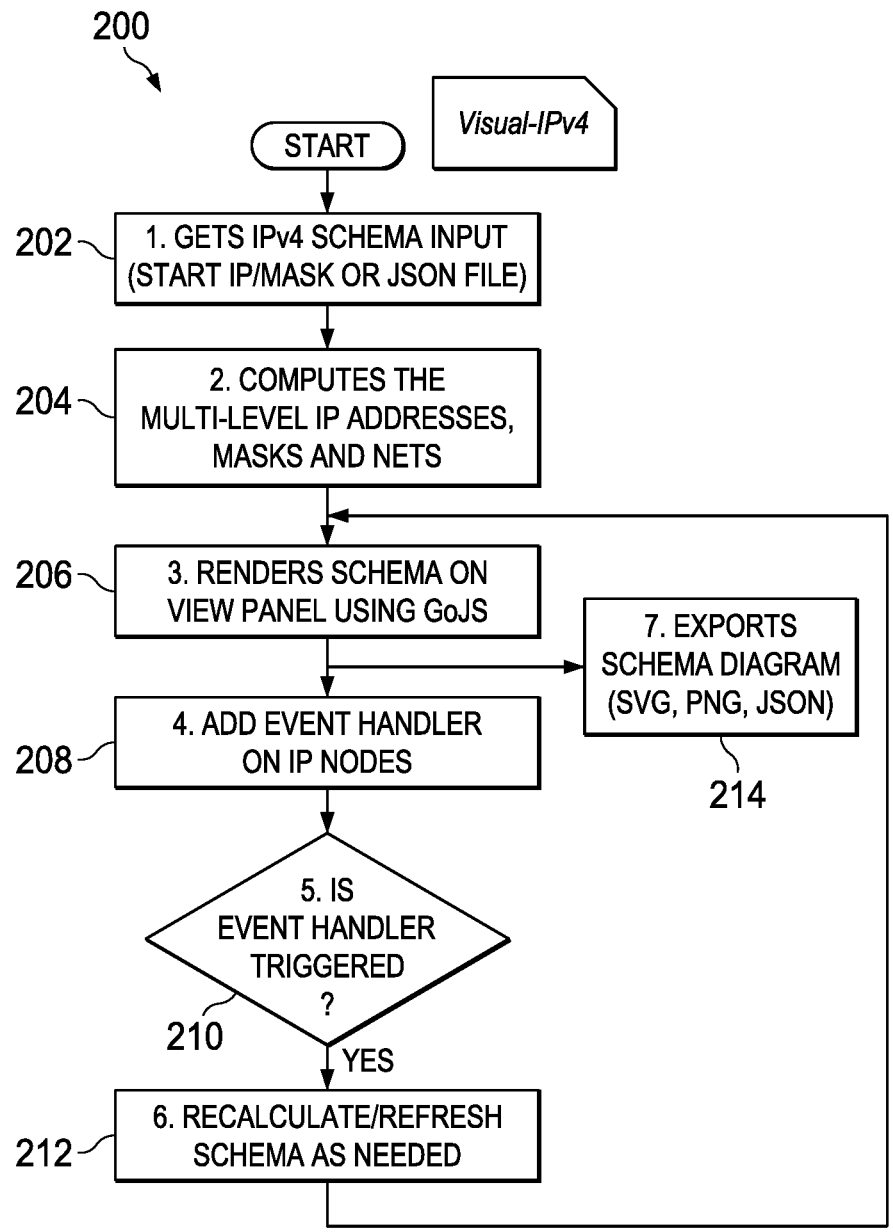
FIG. 2 is a flow diagram of an example application flow of a system for allocating Internet Protocol version 4 (IPv4) addresses, according to an implementation.

FIG. 2 is a flow diagram of an example application flow of a system 200 for allocating IPv4 addresses, according to an implementation. At 202, a required IPv4 schema can be generated with a start IP, a mask, and a desired level, or the IPv4 schema can be generated by loading the previously saved JavaScript Object Notation (JSON) file. At 204, the system can then compute the IP addresses, mask, and nets for each node in the schema.

The IP nodes can then be moved, for example, to a data array or a tree structure. Each element of the array can contain the node object that has node-specific attributes including a parent ID of each node. At 206, a user interface can then render the data array, based on the selected options, on a schema view panel. At 208, an event handler, bound to events such as mouse/touch-drag events, can be attached to every node. At 210, a determination can be made as to whether an event is triggered, as dragging nodes can trigger a translation in the node position which is internally managed, for example, by GOJS. Another event listener, bound to the click event, can also be attached to every single node. This not only allows node to be selected and edited as needed (including annotating with labels and colors), but the node can be expanded or collapsed as needed. At 212, if the event handler is triggered, then the schema is recalculated and refreshed as needed in the user interface.

At 214, exporting of the schema can occur, as the system can also provide an exporting option after a user has created or modified the schema. Export format options can include, for example, Scalable Vector Graphics (SVG), images in Portable Network Graphics (PNG) format, and an updated JSON file. In some implementations, the system can use a hypertext reference (HREF) tag and download property to save the file directly to the client's machine or device, without the intervention of a server.

Figure 3A:
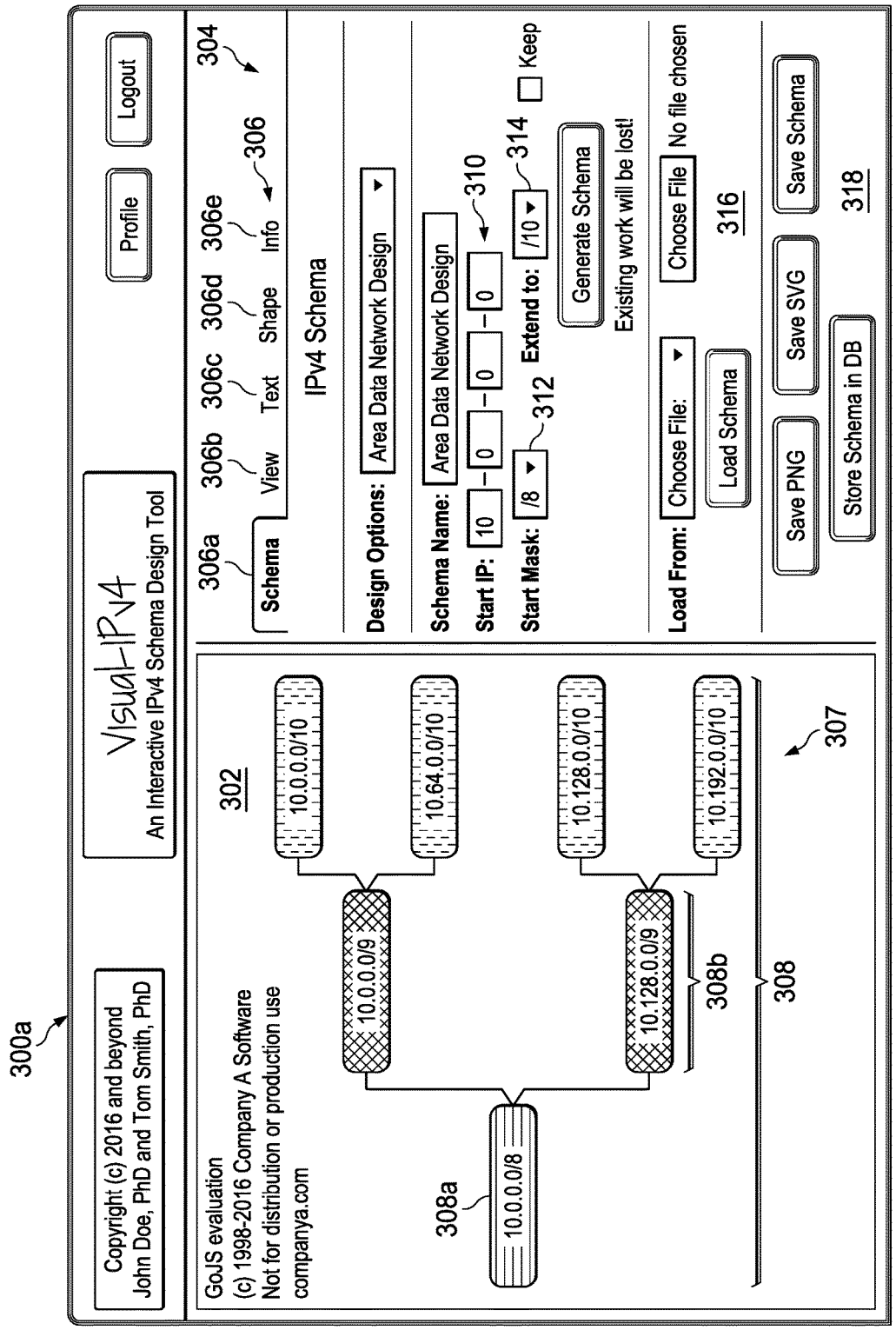
FIG. 3A is a screen shot of an example user interface for designing an Internet Protocol (IP) address schema, according to an implementation.

FIG. 3A is a screen shot of an example user interface 300a for designing an IP address schema, according to an implementation. The user interface 300a can be provided, for example, as a mobile application (on various platforms and operating systems), as a web-based desktop application, or in other forms. The user interface 300a can include a schema view panel 302 for displaying the IP schema and a user control panel 304 for receiving and processing user control and inputs. The user control panel 304 can include, for example, five tabs 306. A schema tab 306a can be used to create any desired IPv4 schema 307 with a required start IP address 310, a start mask 312, and can extend to level 314. Controls 318 can be included to save the current schema 307 in PNG, SVG, or other format which can directly be imported into word processing or other publishing applications. Also, the current schema 307 can be saved in a JSON file that represents the current state of the schema 307, allowing the user to re-load the schema 307 again later to continue working on the design.

Using a view tab 306b, the user can choose an option to show the current schema 307 in various ways including, for example, a vertical layout, a layout showing labels or nets, or a layout with grid lines across the design and including a dark background. Within the schema view panel 302, nodes 308 can be dragged anywhere, and the user can insert multiple additional texts anywhere in the drawing. The additional text can be manipulated in various ways, including being editable, delete-able, rotate-able and drag-able. The schema view panel 302 can also provide expand/collapse options, for example, allowing the user to optionally expand any leaf node to its two next-level children or temporarily collapse a node to hide the node's children. As shown in FIG. 3A, a parent node 308a is expanded to show the node's two children nodes 308b. Nodes such as the parent node 308a in FIG. 3A (and other figures that display nodes) indicate a starting IP address in the range, such as 10.0.0.0, and the starting mask, such as/8, indicating the number of bits that are identical.

Options can also be provided for zooming and panning the current display in the schema view panel 302, such as to access various parts of an entire schema diagram, which can be quite useful for large schema diagrams. The text tab 306c and the shape tab 306d can allow the user to edit attributes of a selected node 308, such as the color and the label of the node 308. A particular node can be selected, for example, either by clicking on the node in the schema view panel 302 or through user input in an info tab 306e. For example, the info tab 306e can display or allow user input and selection of some of the parameters of nodes 308, such as a name, a root or start IP, a number of nodes, and a display style. A list of all nodes 308 and their attributes can also be displayed using the info tab 306e. The output of the current schema 307 can be in various user-selected formats including, for example, PNG and high-quality SVG and Portable Document Format (PDF), allowing direct importation into various publishing applications, such as LATEX. HTML files can also be created, such as with embedded JavaScript for interactive plotting, which can support presentations and on-line content.

Various IPv4 schema design methodologies can be used. For example, in an enterprise network, IP addresses can be assigned to: 1) user-networks (such as user-data, user-voice, and user-wireless); 2) management-networks (such as network devices, infrastructure services, and security devices); and 3) test-networks (such as quality assurance (QA) networks, user acceptance test (UAT) networks, development (dev) networks, and lab networks).

Since the most IP addresses may be required to be assigned to user/data networks, the RFC-1918 blocks can be utilized in such a way as to optimize the IPv4 allocation and the routing table of the assigned subnets. In conventional systems, there may be no clearly-defined methodology for using these reserved IP addresses inside a company's enterprise network. Network engineers may typically assign IP addresses randomly or on an as-needed basis without a design methodology that allows for a global hierarchical IP address schema design and subnet allocation. A methodology presented here allows for a structured IP address allocation by subnets. Moreover, the methodology makes it possible to have a globally summarizable design that helps reduce the routing table in the core and clearly identifies the subnets by user, management, and test subnets. This can also facilitate a proper security design for permitting traffic between user, management, and test networks in a simplified way. This disclosure also proposes a visual tool that helps in the structured and hierarchical design of IPv4 addresses for any network.

One example recommendation is using separate addresses for different purposes, as listed in Table 2:

TABLE 2

Address Purposes

| Address | Purpose |
|---|---|
| 10.0.0.0/8 | User Networks (Data, Voice, Wireless) |
| 172.16.0.0/12 | Management Networks (WAN/LAN), Infrastructure Services, Security devices |
| 192.168.0.0/16 | Test Networks (QA, UAT, Development, LAB) |

A structured IP address allocation can, for example, ensure that the addresses are optimally assigned, thus requiring a smaller routing table and providing full utilization of address space. To achieve this, one example recommendation is to divide each of the address blocks into global geographic territories including, for example, the Americas, Europe, Africa-Middle-East, and Asia-Pacific.

Inputs to the user interface 300a can be in various forms. For example, the inputs can be received from a user using an interactive form, such as through inputs in a schema tab 306a in which the user identifies a start IP and a mask. In another example, inputs can be received from an external file, such as a JSON file, loaded through the use of load controls 316.

FIG. 3B lists example statements 300b providing input to the example user interface 300a, according to an implementation. Processing that is performed in support of the user interface 300a can include, for example, binary tree algorithms that are applied on the start IP and mask to generate the IP schema with IP address/mask computed for each node. Example binary trees are provided with reference to FIGS. 4-6, 8-10, and 12-17.

Outputs of the user interface 300*a* can be controlled through output controls 318. Outputs can include a file, such as in JSON format, which can include diagram properties and node properties representing a visualization of a schema diagram, such as to represent and render the schema 307 in the view tab 306*b*. The properties can define, for example, IP addresses, colors, nets, labels, and geographic locations. A final IP schema diagram can be manipulated by the user by minimizing or collapsing some nodes.

At decision points during the use of the user interface 300*a*, decisions are made based on entries in a start IP address 310, a start mask 312, and an extend to level 314, as entered by user.

Figure 5:
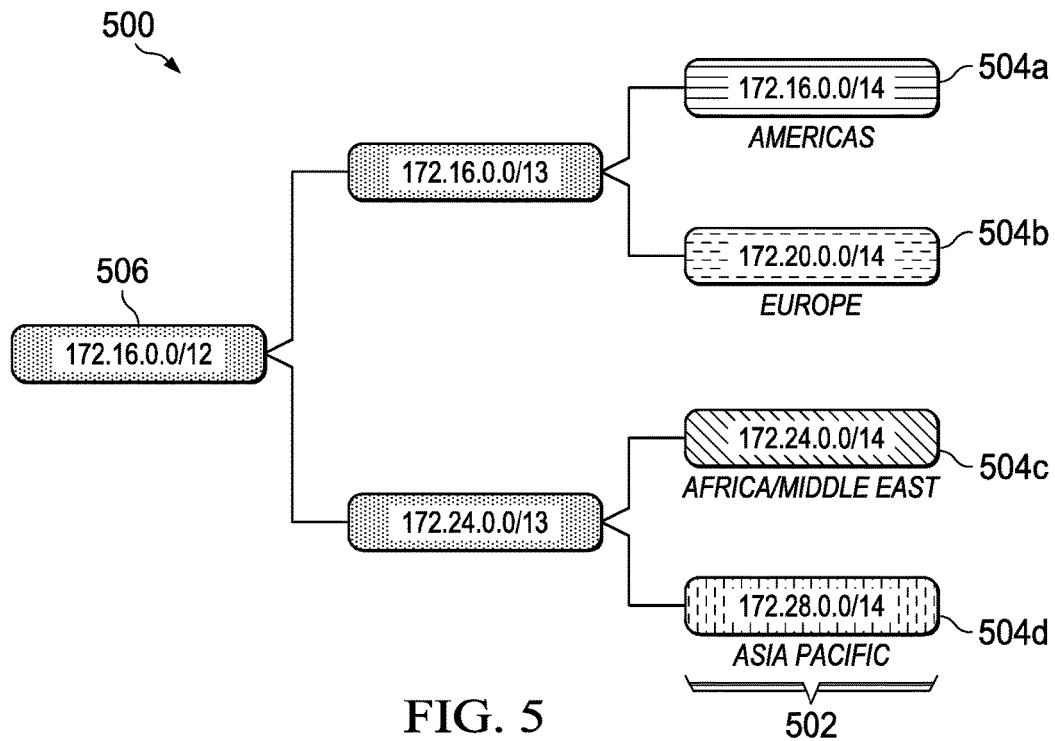
Figure 6:
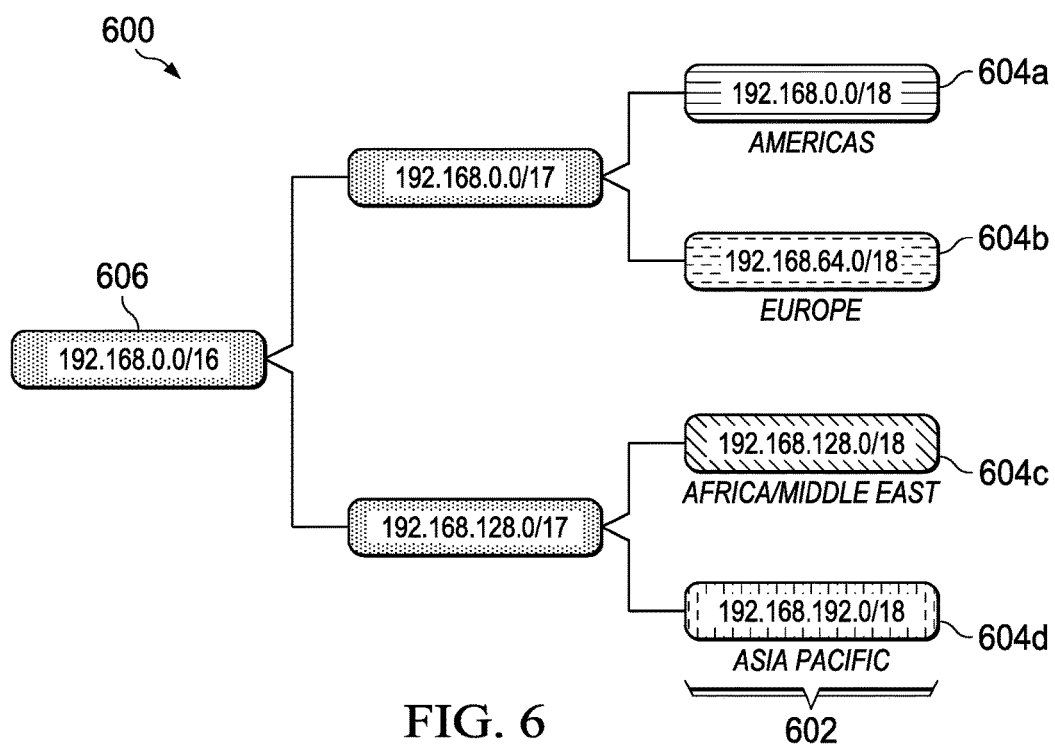

FIGS. 4-6 are diagrams 400, 500, and 600, respectively, illustrating example IP address global allocations by global geographic territory, according to an implementation. In general, allocation of IP addresses may be limited to one location, such as if a company has no global presence, or allocation of IP addresses may apply to many locations, such as if the company has a global presence. Three-address blocks of RFC-1918 can be assigned globally as summarized in FIGS. 4-6. This allocation can assure that each of the global geographic territories uses blocks 402 (/10) for user networks, blocks 502 (/14) for management networks, and blocks 602 (/18) for test networks.

Figure 7:
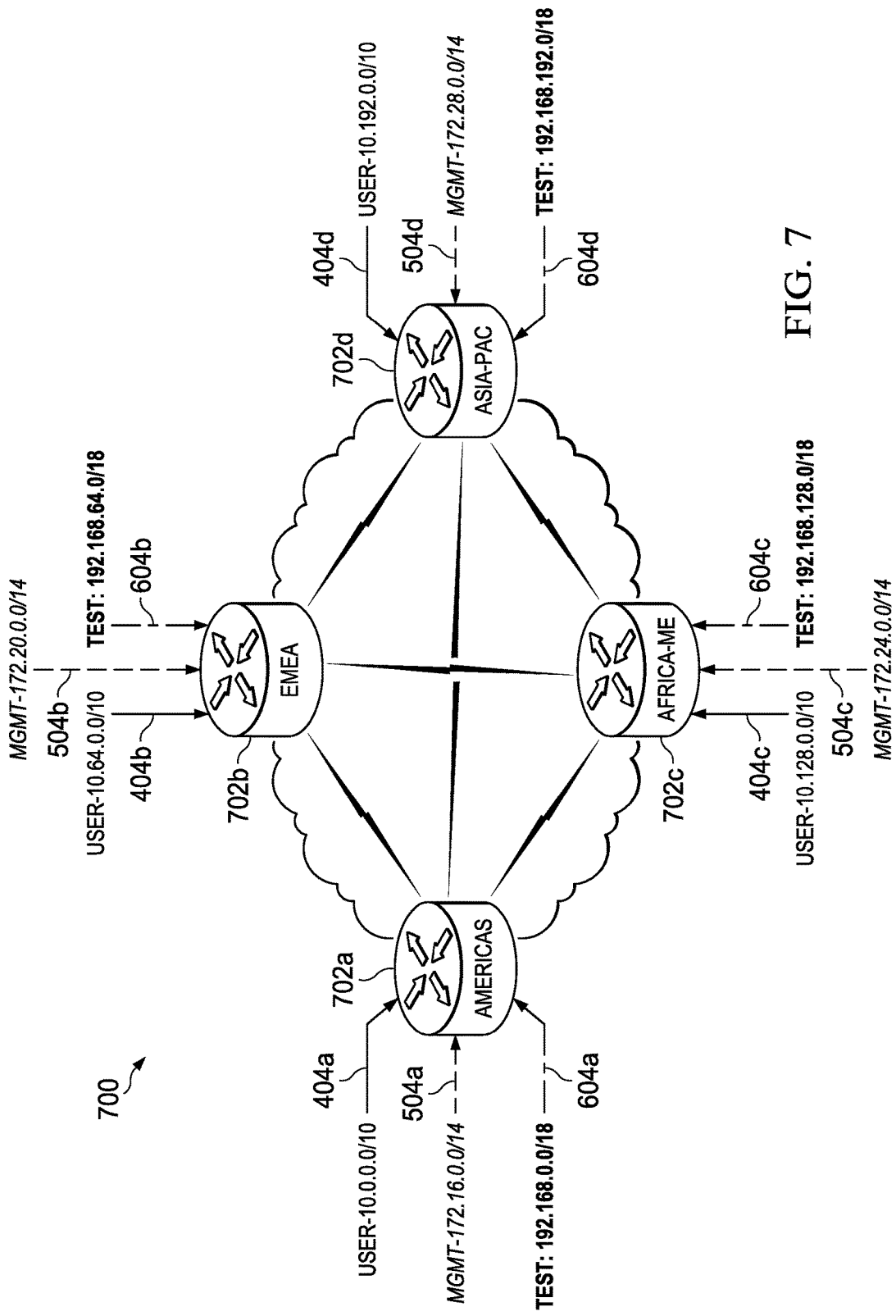
FIG. 7 is a diagram of a core routing table with IP address blocks allocated geographically and by user community, according to an implementation.

FIG. 7 is a diagram of a core routing table 700 with IP address blocks allocated geographically and by user community, according to an implementation. Geographic allocation can be by global geographic territories, such as the Americas, Europe, Africa-Middle-East, and Asia-Pacific. User communities, for example, can exist for a group of users in a user network, members of management, and a test group, among other possible ways of grouping user communities. Specifically, user network address ranges 404*a*-404*d*, management network address ranges 504*a*-504*d*, and test network address ranges 604*a*-604*d* are shown in FIG. 7 grouped by global geographic territory 702*a*-704*d*.

Referring to FIG. 4, for global user networks, a 10.0.0.0/8 network 406 can be used in such a way that each territory is assigned a summarized range and scalable network for future expansion. For example, four /10 address spaces (one per territory) can be selected. This can allow $2^{14}$ or 16K /24 networks and $2^{22}$ or 4M user network IP addresses per territory.

Referring to FIG. 5, for the management networks, a 172.16.0.0/12 network 506 can be used in such a way that each region is assigned a summarized range and scalable network for future expansion. Four /14 address spaces (one per territory) can be selected. This can allow $2^{10}$ or 1K /24 networks and $2^{18}$ or 256K management network IP addresses per territory.

Referring to FIG. 6, for the test networks, a 192.168.0.0/16 network 606 can be used in such a way that each region is assigned a summarizable and scalable address space for future growth. Four /18 address spaces (one per territory) can be selected. This can allow $2^6$ or 64 /24 networks and $2^{14}$ or 16K test network IP addresses per territory.

In some implementations, within each of the four global geographic territories, sub-allocations can be made. For example, further regional allocation design can use a contiguous block of IP addresses within the geographic location. In an example that follows, the Americas are selected as a global geographic territory for sub-allocations, such as by region (Americas-NE, Americas-NW, Americas-SE, and Americas-SW, for northeast, northwest, southeast, and southwest regions, respectively). Other types of granular design details can be provided to the Americas or to the other global geographic territories as well. Further, at this and most other levels, a given address block can be split into two separate address blocks, such as in a 50-50 split.

Figure 8:
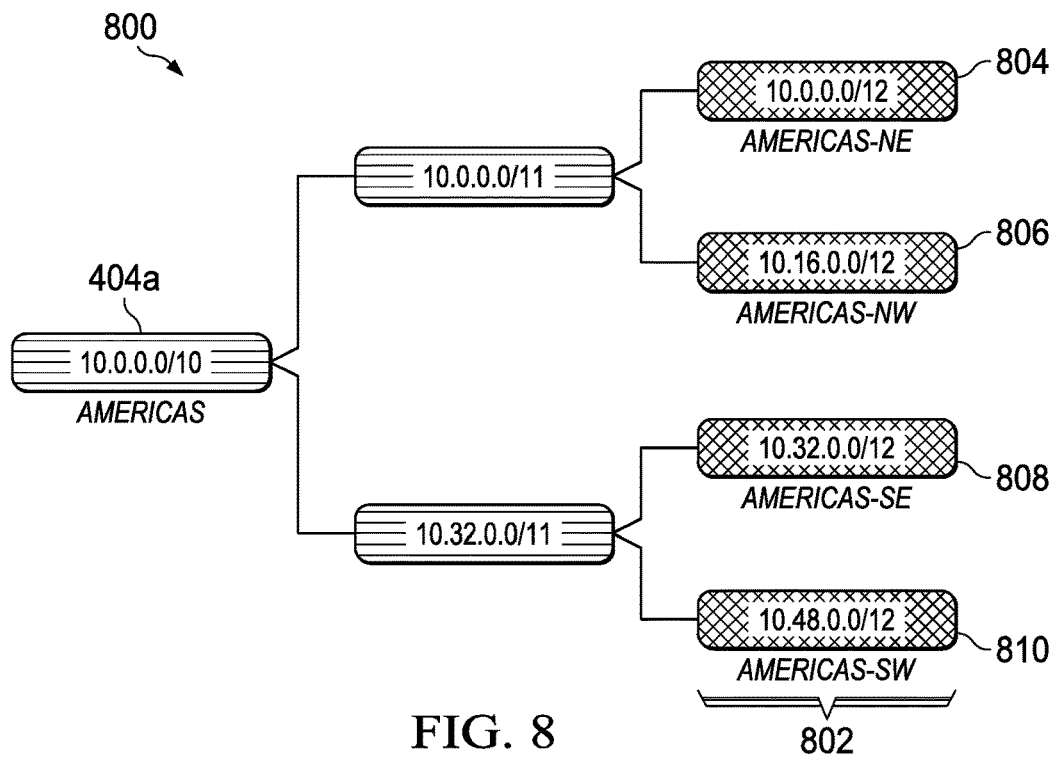
FIGS. 8-10 are diagrams illustrating example sub-allocations by region, according to an implementation.
Figure 9:
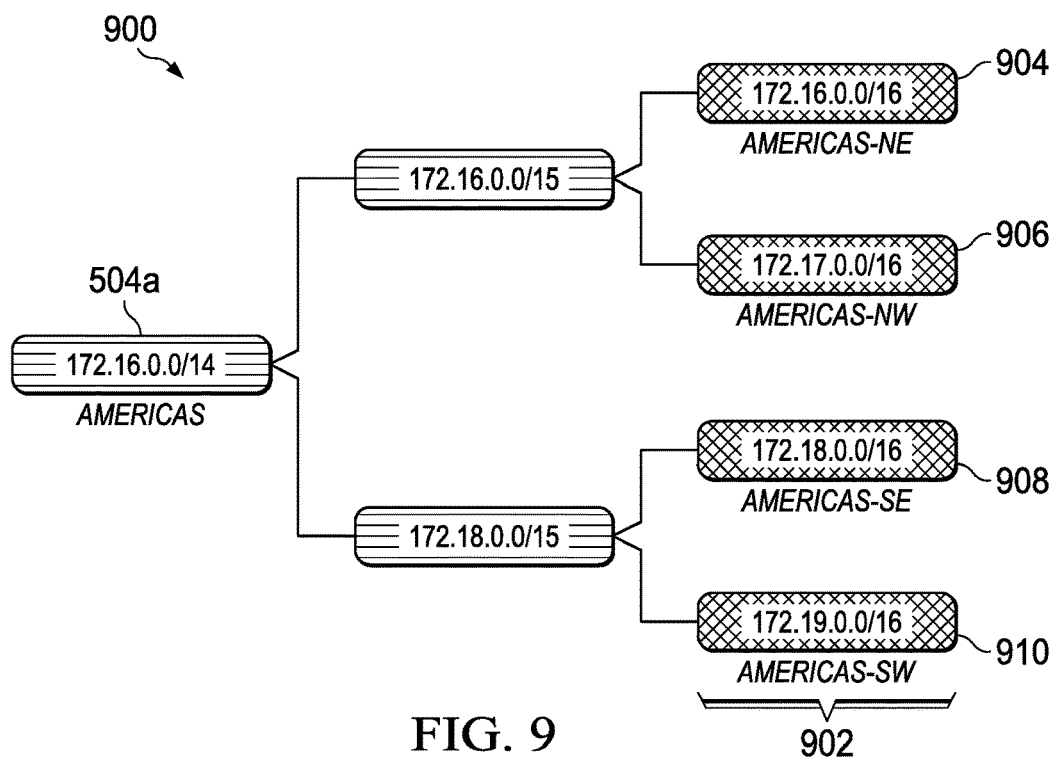
Figure 10:
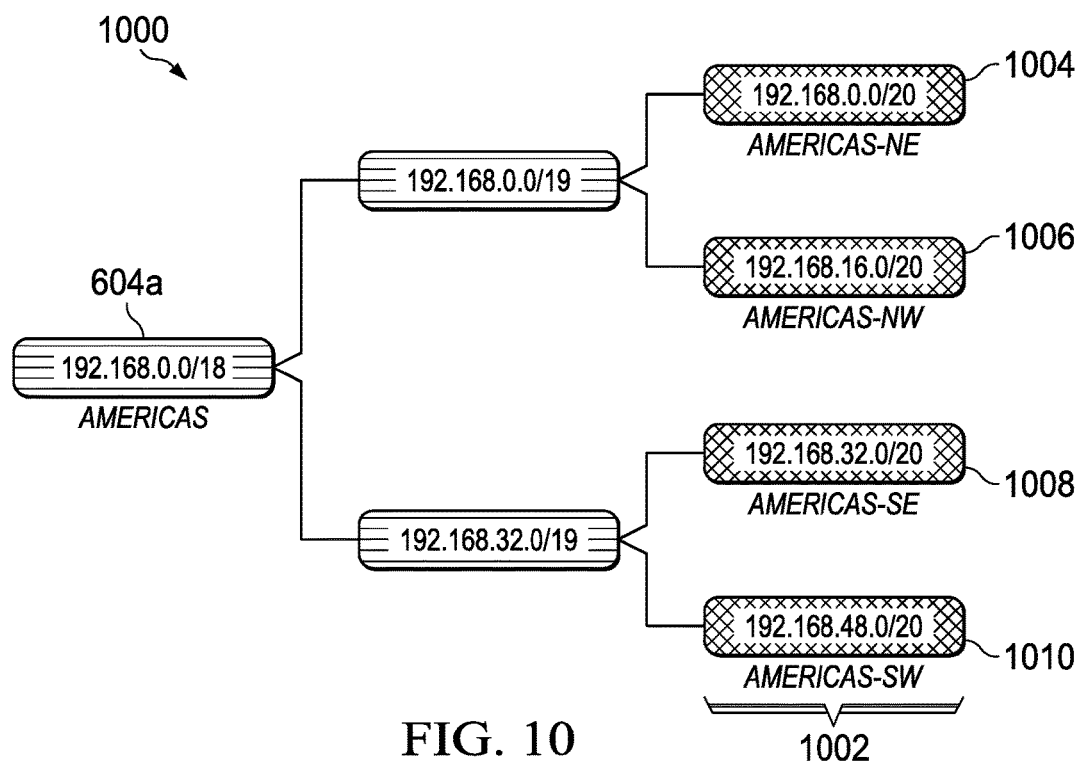

FIGS. 8-10 are diagrams 800, 900, and 1000, respectively, illustrating example sub-allocations by region, according to an implementation. For example, FIGS. 8-10 illustrate sub-allocations 802, 902, and 1002 corresponding to user network, management network, and test network allocations, respectively. Specifically, the sub-allocations 802, 902, and 1002 are allocated from the user network address range 404*a*, the management network address range 504*a*, and the test network address ranges 604*a*, respectively, for the Americas global geographic territory. The user network sub-allocations 802 are divided into Americas-NE range 804, Americas-NW range 806, Americas-SE range 808, and Americas-SW range 810. The management network sub-allocations 902 are divided into Americas-NE range 904, Americas-NW range 906, Americas-SE range 908, and Americas-SW range 910. The test network sub-allocations 1002 are divided into Americas-NE range 1004, Americas-NW range 1006, Americas-SE range 1008, and Americas-SW range 1010.

Figure 11:
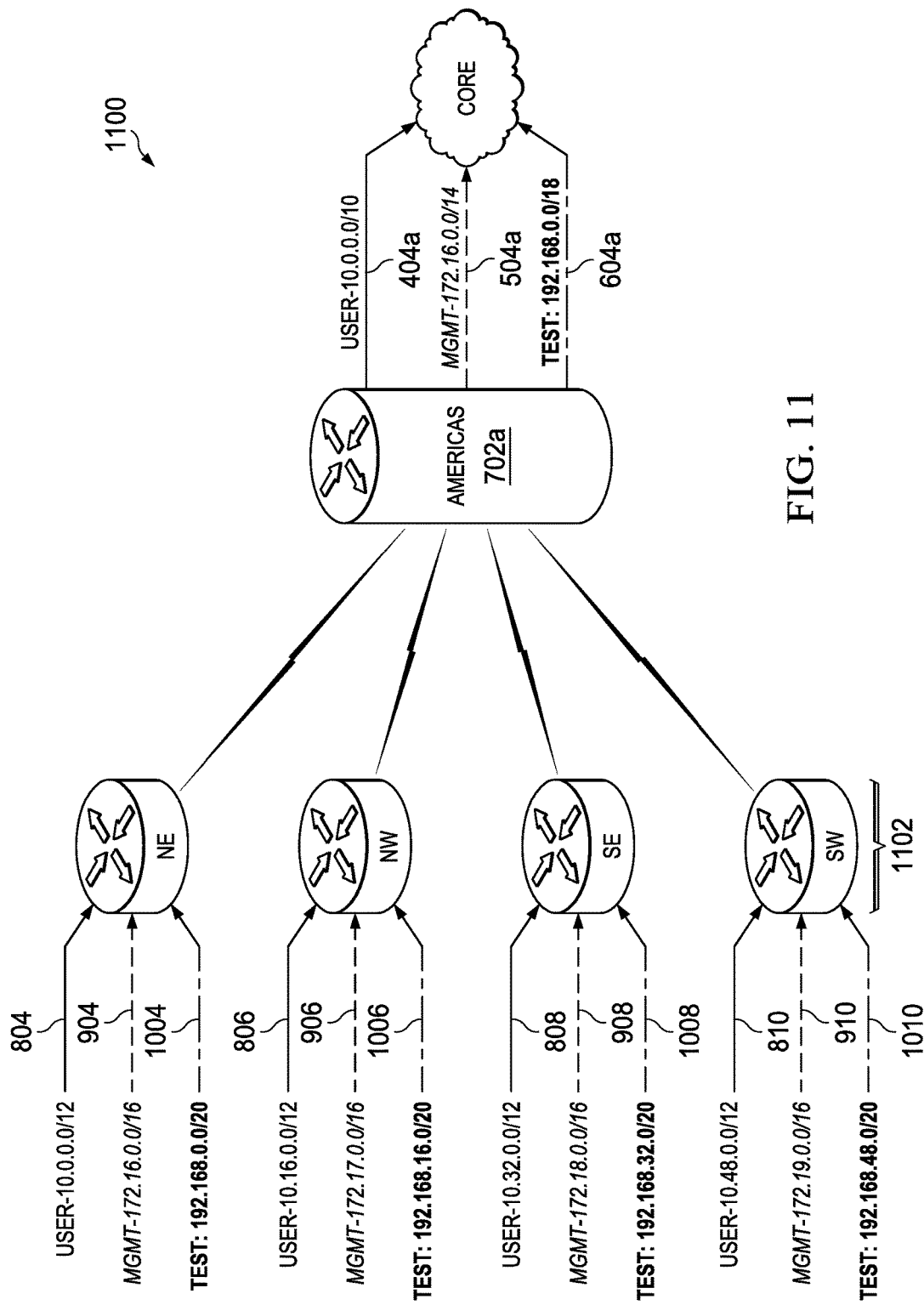
FIG. 11 is a diagram illustrating example optimal route table entries from each of the four Americas regions into the core network, according to an implementation.

FIG. 11 is a diagram illustrating example optimal route table entries from each of the four Americas regions 1102 into the core network 1100, according to an implementation. For example, FIG. 11 shows how the ranges 804-810, 904-910, and 1004-1010 are mapped to the Americas regions 1102 for the Americas global geographic territory 702. In some implementations, regions can be further subdivided (and IP addresses sub-allocated) as long as rules of contiguous and hierarchical address space allocation are followed.

After IP addresses have been allocated to regions, for example, a next step can be to allocate IP addresses within a particular region to the various types of traffic, such as data center, user-data, user-VOIP, and user-Wifi. Other divisions are possible. To illustrate an example of allocation by types of traffic, the Americas-NE region has been picked and expanded on the three network allocations (user, management, and test) into different types of traffic.

Figure 12:
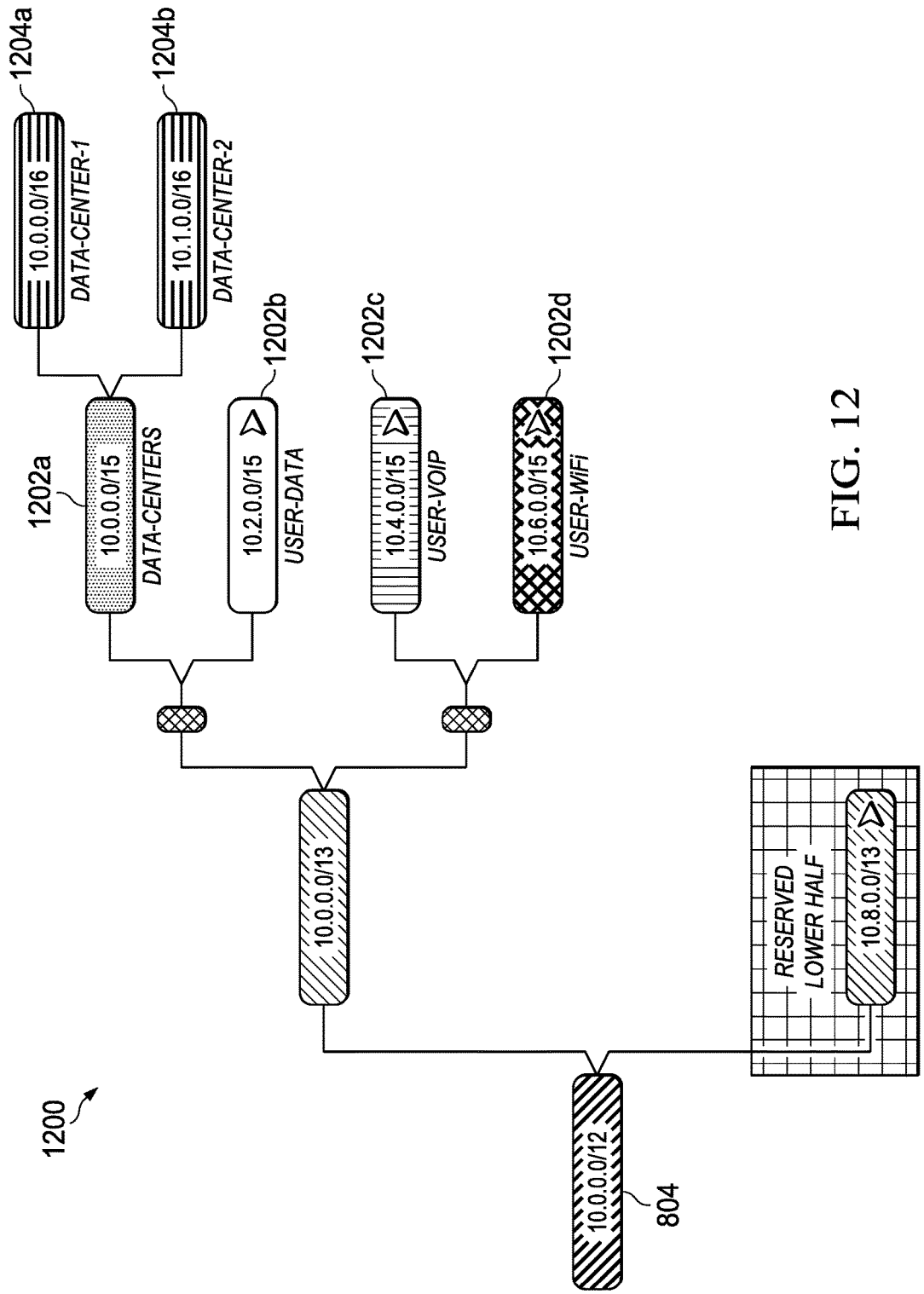
FIGS. 12-14 are diagrams illustrating example sub-allocations of IP addresses to types of traffic, according to an implementation.
Figure 13:
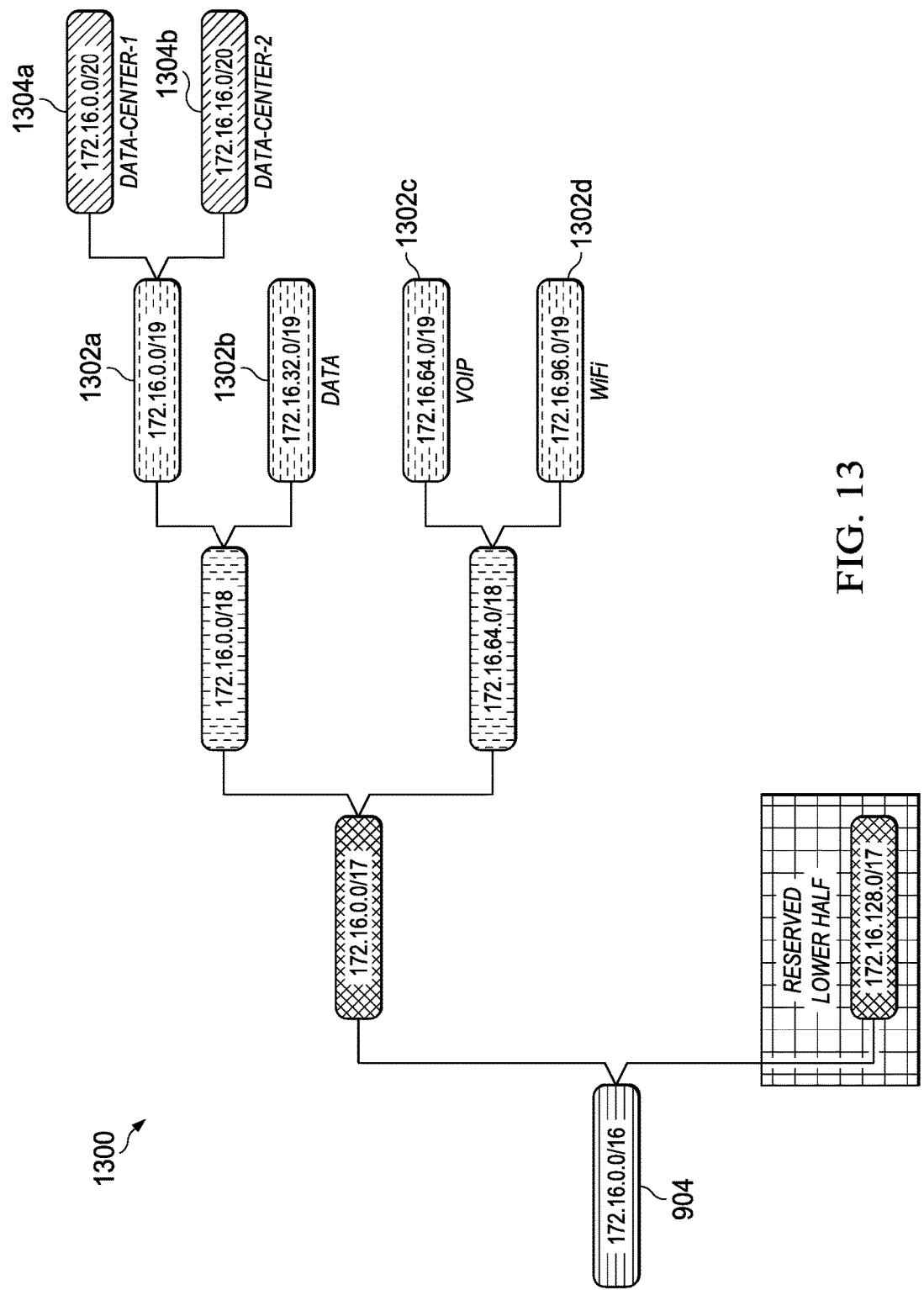
Figure 14:
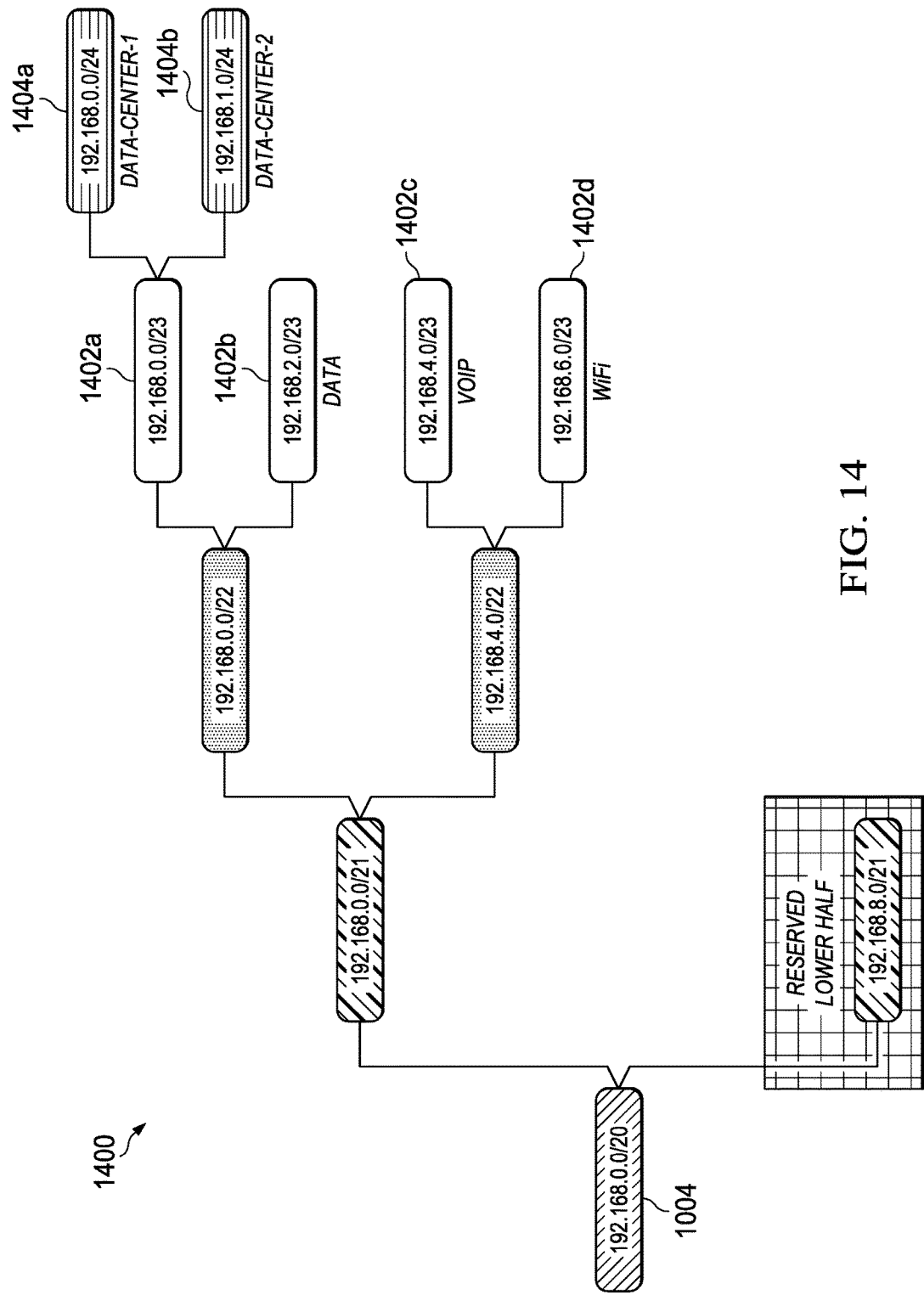

FIGS. 12-14 are diagrams illustrating example sub-allocations of IP addresses to types of traffic, according to an implementation. Referring to FIG. 12, for example, the Americas-NE range 804 for user networks serves as the root for a subdivision 1200, including ranges 1202*a*-1202*d* for data centers, user-data, user-VoIP, and user-Wifi, respectively. The range 1202*a* for data centers is further subdivided into data centers 1204*a*-1204*b*.

Referring to FIG. 13, the Americas-NE range 904 for management serves as the root for a subdivision 1300, including ranges 1302*a*-1302*d* for data centers, user-data, user-VoIP, and user-Wifi, respectively. The range 1302*a* for data centers is further sub-divided into data centers 1304*a*-1304*b*.

Referring to FIG. 14, the Americas-NE range 1004 for test serves as the root for a subdivision 1400, including ranges 1402*a*-1402*d* for data centers, user-data, user-VoIP, and user-Wifi, respectively. The range 1402*a* for data centers is further sub-divided into data centers 1404*a*-1404*b*.

An example of detailed class-C networks and IP address availability for users is shown in Table 3:

TABLE 3

Class-C Networks and IP Address Availability

| Type | Network | # of /24 networks | # of Users |
|---|---|---|---|
| Global-User | 10.0.0.0/10 | $2^{14}$ or 16K | $2^{22}$ or 4M |
| Global-Management | 172.16.0.0/14 | $2^{10}$ or 1K | $2^{18}$ or 256K |
| Global-Test | 192.168.0.0/18 | $2^{6}$ or 64 | $2^{14}$ or 16K |
| Region-User | 10.0.0.0/12 | $2^{12}$ or 4k | $2^{20}$ or 1M |
| Region-Management | 172.16.0.0/16 | $2^{8}$ or 256 | $2^{16}$ or 64K |
| Region-Test | 192.168.0.0/20 | $2^{4}$ or 16 | $2^{12}$ or 4K |
| Data Center | 10.0.0.0/15 | $2^{9}$ or 512 | $2^{15}$ or 32K |
| User-Data | 10.2.0.0/15 | $2^{9}$ or 512 | $2^{15}$ or 32K |
| User-VoIP | 10.4.0.0/15 | $2^{9}$ or 512 | $2^{15}$ or 32K |
| User-Wifi | 10.6.0.0/15 | $2^{9}$ or 512 | $2^{15}$ or 32K |

The number of class-C networks is typically more than enough for a large enterprise network, while still providing room for expansion to increase the subnets from the unused IP space in such a way to ensure the optimal summarization of routes is still possible. Similarly, the management and test network IP subnets can also be designed in such a way so as to optimize a routing table.

Referring to FIGS. 7 and 11, it can be seen that all three RFC 1918 address blocks are allocated to regions such that they are hierarchical and summarizable, while distinguishing between user, management and test networks, and while further filtering traffic between the three types of traffics. This type of allocation can help to restrict traffic between these networks. This type of allocation can also be very helpful in troubleshooting specific types of traffic, as the traffic is defined clearly by the address block.

Referring to FIGS. 12-14, it is possible to provide an enterprise-wide data center IPv4 address schema. For example, assignment can be made of one /15 user network, one /19 management network, and one /23 test network to data center. Optionally, this assignment can be scaled to two data centers, each with a /16 user network, a /20 management network, and a /24 test network.

For a performance-optimized datacenter (POD) design, selection can be made of one or more combinations of different POD-types. For example, POD-1 can be a VCE defined virtual datacenter infrastructure (VBLOCK), POD-2 can be a flexible POD (FLEXPOD), POD-3 can be a NetApp defined virtual datacenter infrastructure (VSPEX), and POD-4 can be infrastructure services. Note that VBLOCK is a VCE standard, FLEXPOD is NetApp standard, and VSPEX is an EMC standard for virtualized data center infrastructure.

Figure 15:
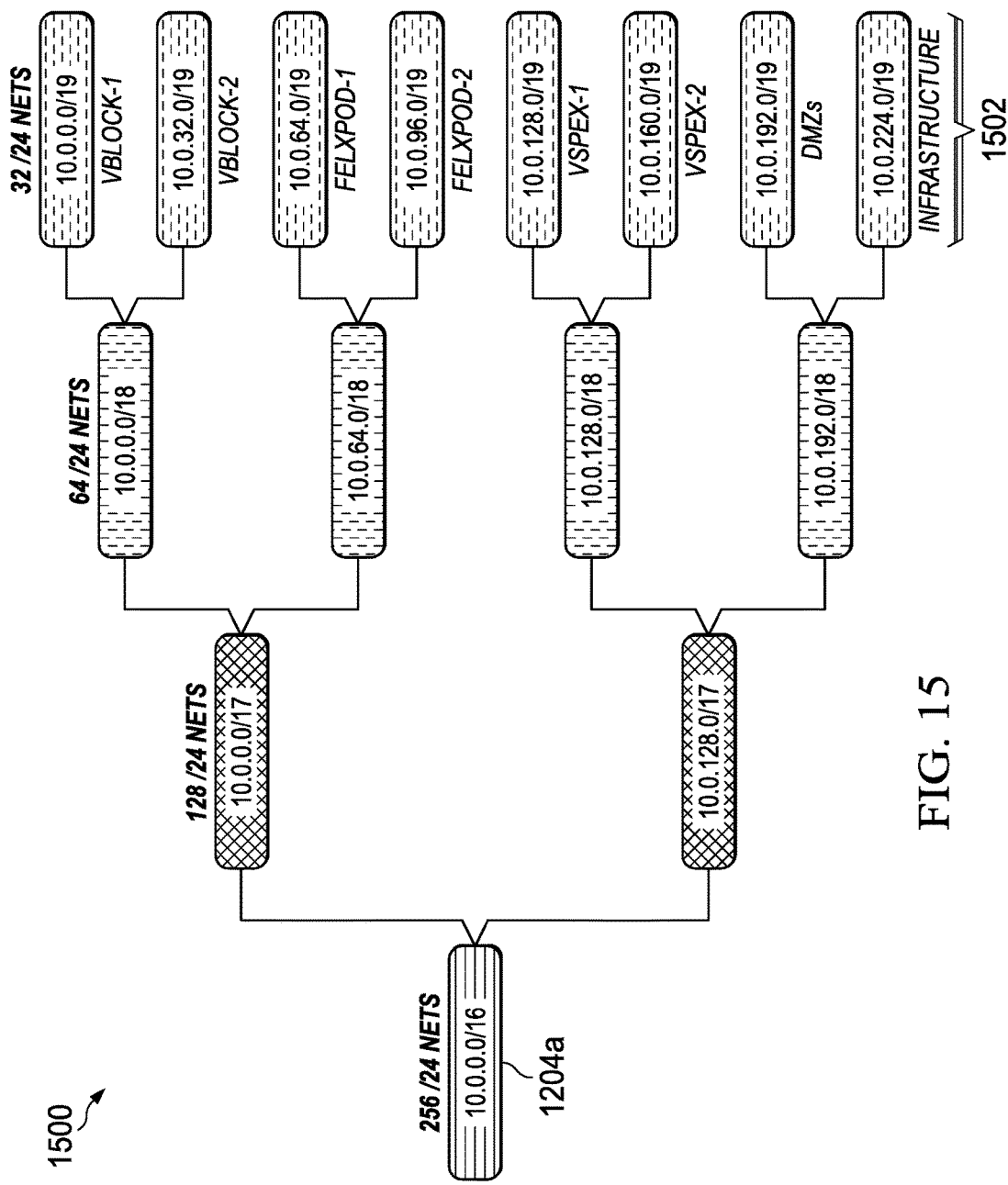
FIGS. 15-17 are diagrams illustrating example IP address allocation of data center, management, and test groups in a multiple performance-optimized datacenter (POD) design, according to an implementation.
Figure 16:
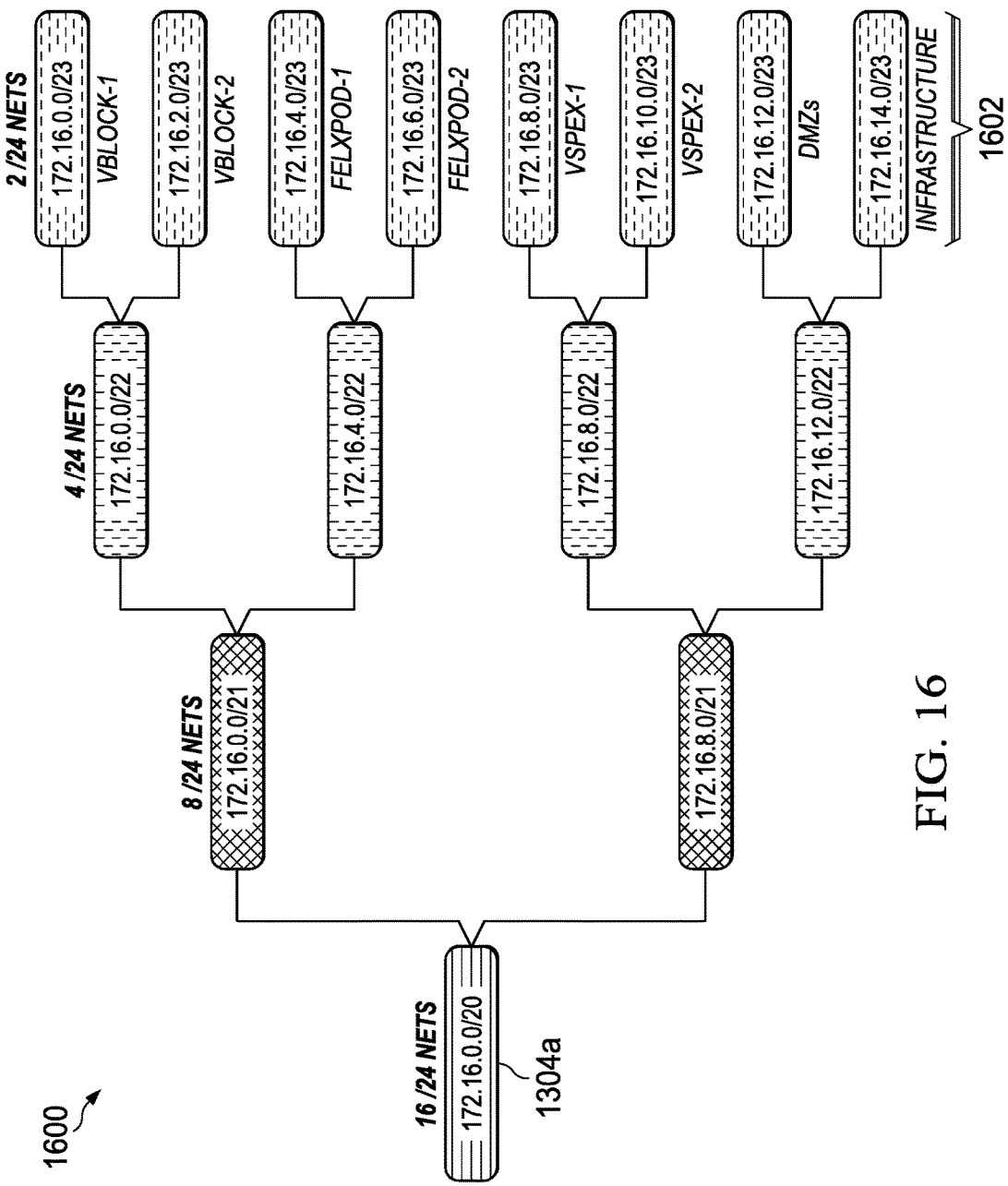
Figure 17:
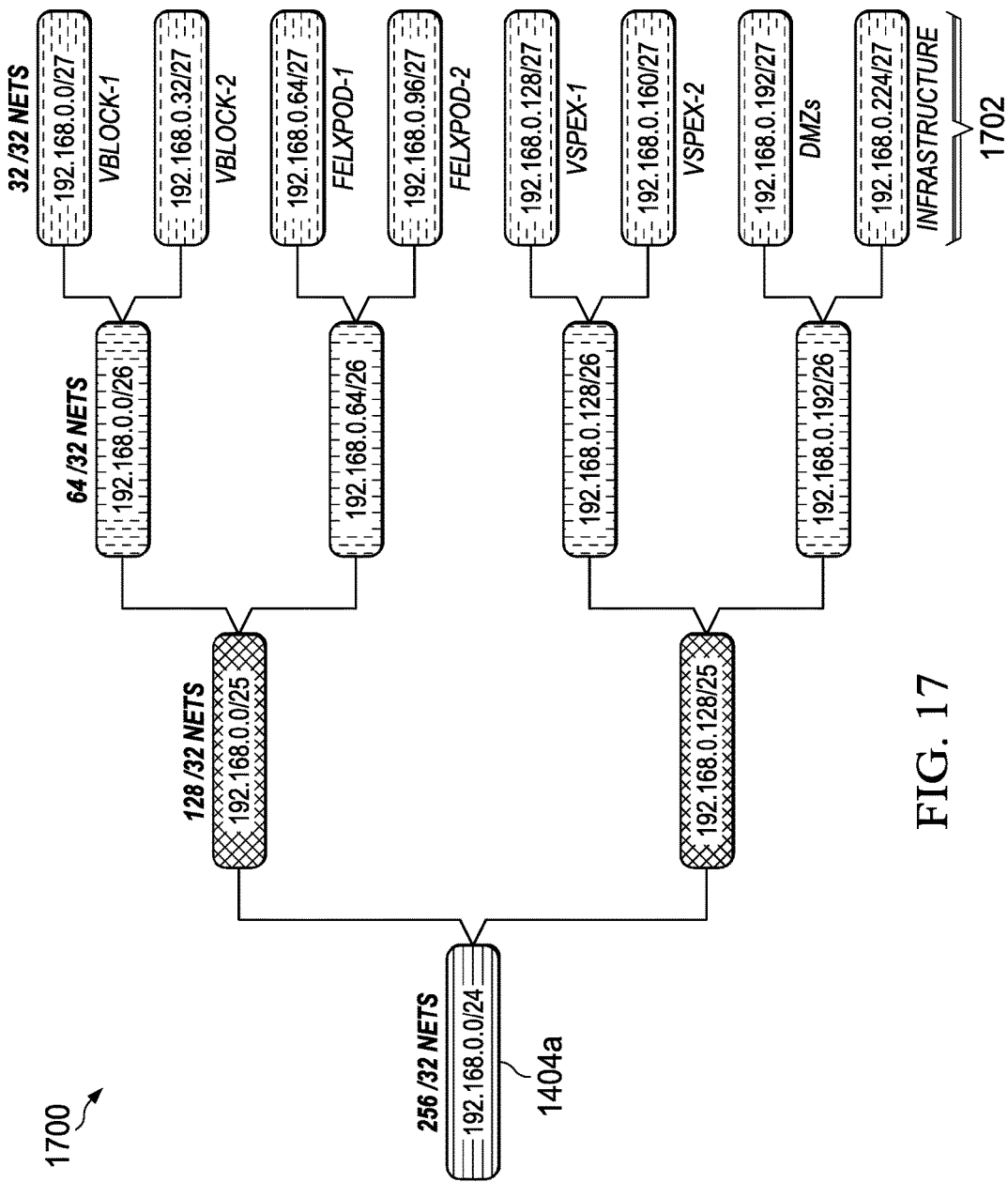

FIGS. 15-17 are diagrams 1500, 1600, and 1700 illustrating example IP address allocations of data center, management, and test groups in a multiple POD design, according to an implementation. For example, referring to FIG. 15 (data center user IPs for multi-POD design), for the user network, the system can reserve one /16 address block for a data center. This allows for the design of eight PODs, represented by address blocks 1502, 1602, and 1702, each with one/19 address spaces ($2^{5}$ or 32 /24 networks, and $2^{13}$ or 8K IP addresses per POD, as pictorially represented in FIG. 15.). The other /16 networks within the user-dedicated address space can be similarly designed. These 32× /24 networks can allow for 32 class-C VLANs per POD, which can be allocated for various server farms within the POD. The advantage of such design is that it is structured and easily scalable for future expansion.

Referring to FIG. 16 (data center management IPs for multi-POD design), the system can reserve one /20 address block for a data center. This can allow for a design of eight PODs, each with one /23 address spaces ($2^{1}$ or 2 /24 networks and $2^{11}$ or 2K IP addresses per POD, as pictorially represented in FIG. 16). These 2× /24 networks can allow for two class-C VLANs per POD, which can be allocated for various server farm management interfaces within the POD. The other/20 network can be similarly designed.

Referring to FIG. 17 (data center test IPs for multi-POD design), for the test network, the system can reserve one /24 address block. This can support eight PODs, each with one /27 address spaces ($2^{5}$ or 32 IP addresses per POD, as pictorially represented in FIG. 17). The other /24 network can be similarly designed.

In some implementations, other considerations for allocating and dividing IP addresses can be used instead of, or in addition to, geographic, regional, location, office types. However, three criteria proposed for the design include allocations by user network, management network, and test network. The user network design is further expanded into three sub-divisions, including user-data network, user-Wifi network, and user-VoIP network. In some implementations, other expansions can be used for networks from the start IP address 310 to the start mask 312 as entered by user. This can allow the system to provide a visual representation of all possible prefixes within the range entered.

Figure 18:
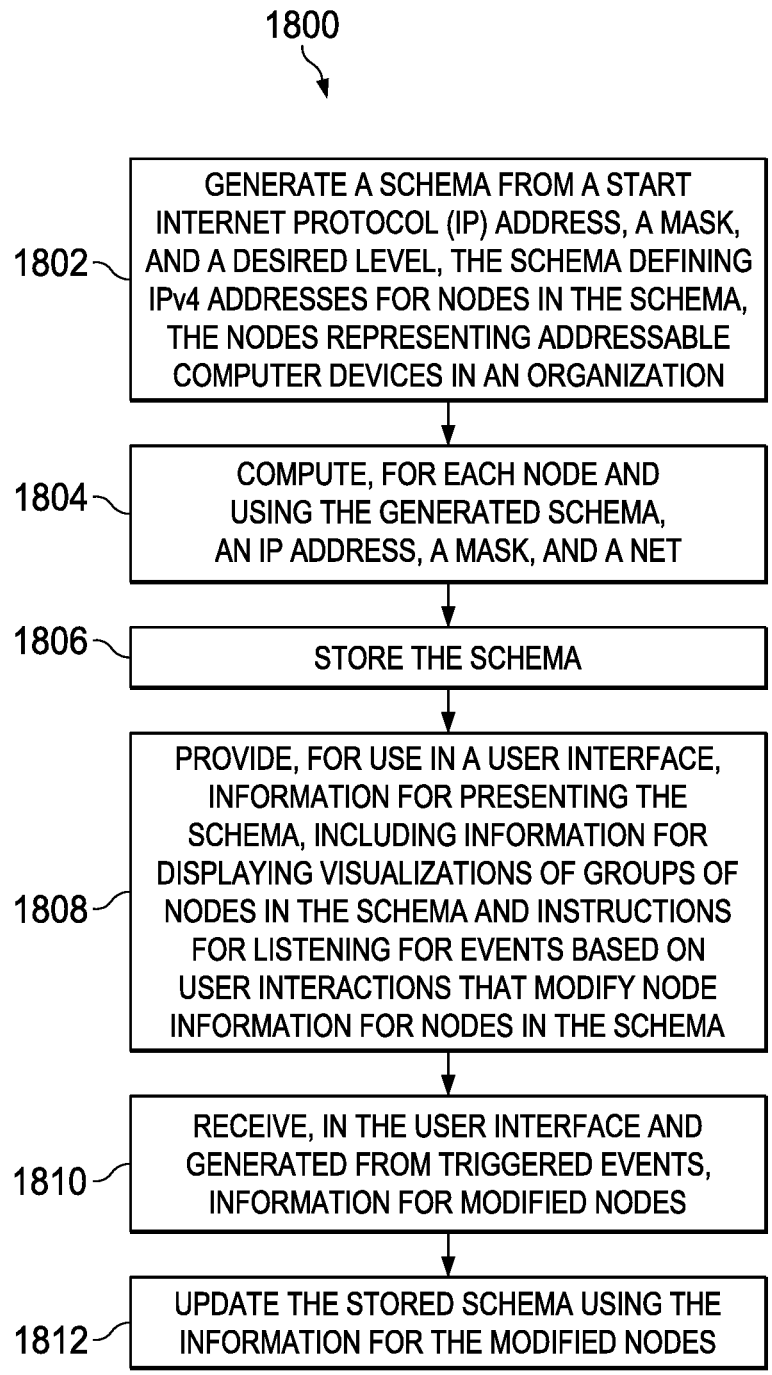
FIG. 18 is a flowchart of an example method for allocating IPv4 addresses, according to an implementation.

FIG. 18 is a flowchart of an example method 1800 for allocating IPv4 addresses, according to an implementation. For clarity of presentation, the description that follows generally describes method 1800 in the context of the other figures in this description. However, it will be understood that method 1800 may be performed, for example, by any suitable system, environment, software, and hardware, or a combination of systems, environments, software, and hardware as appropriate. In some implementations, various steps of method 1800 can be run in parallel, in combination, in loops, or in any order.

At 1802, generating a schema from a start Internet protocol (IP) address, a mask, and a desired level, the schema defining IPv4 addresses for nodes in the schema, the nodes representing addressable computer devices in an organization. For example, the generated schema can be the schema depicted in the schema view panel 302 described above with reference to FIG. 3A. From 1802, method 1800 proceeds to 1804.

At 1804, an IP address, a mask, and a net are computed for each node, using the generated schema. From 1804, method 1800 proceeds to 1806. For example, one or more of the start IP address, the mask, and the desired level can be received from a user, such as in the user control panel 304 described above with reference to FIG. 3A. In another example, the IP address, mask, and net can be retrieved from a file, such as a JSON file, such as designated by the user through the user interface 300a and controlled through output controls 318, as described above.

At 1806, the schema is stored. For example, storing the schema can include storing the nodes in a tree structure with masks and nets that divide the nodes by one or more of geography, user group, and function, for example, as represented by the tree structures depicted in FIGS. 4-6. In another example, storing the schema can include storing the schema in a JSON file or in a spreadsheet, such as a series of rows and columns. User selections from the output controls 318 can control how the schema is stored, as described above with reference to FIG. 3A. From 1806, method 1800 proceeds to 1808.

At 1808, information for presenting the schema is provided for use in a user interface. For example, the information includes information for displaying visualizations of groups of nodes in the schema and instructions for listening for events based on user interactions that modify node information for nodes in the schema. For example, the user interactions can include mouse touches, dragging, mouse clicks, and user inputs to change colors and labels. The information presented to the user can include, for example, the information presented in the user interface 300a, described above with reference to FIG. 3A. From 1808, method 1800 proceeds to 1810.

At 1810, information for modified nodes is received in the user interface and generated from triggered events. For example, user actions in the user interface 300a can be used to modify nodes in the schema. From 1810, method 1800 proceeds to 1812.

At 1812, the stored schema is updated using the information for the modified nodes. For example, user inputs in the user interface 300a can be used to modify nodes in the schema. From 1812, method 1800 stops.

In some implementations, the method 1800 also includes exporting the schema. For example, format options for exporting the schema can include scalable vector graphics (SVG), an image in portable network graphics (PNG) format, an updated JSON file, and a hypertext reference (href) tag with a download property.

Figure 19:
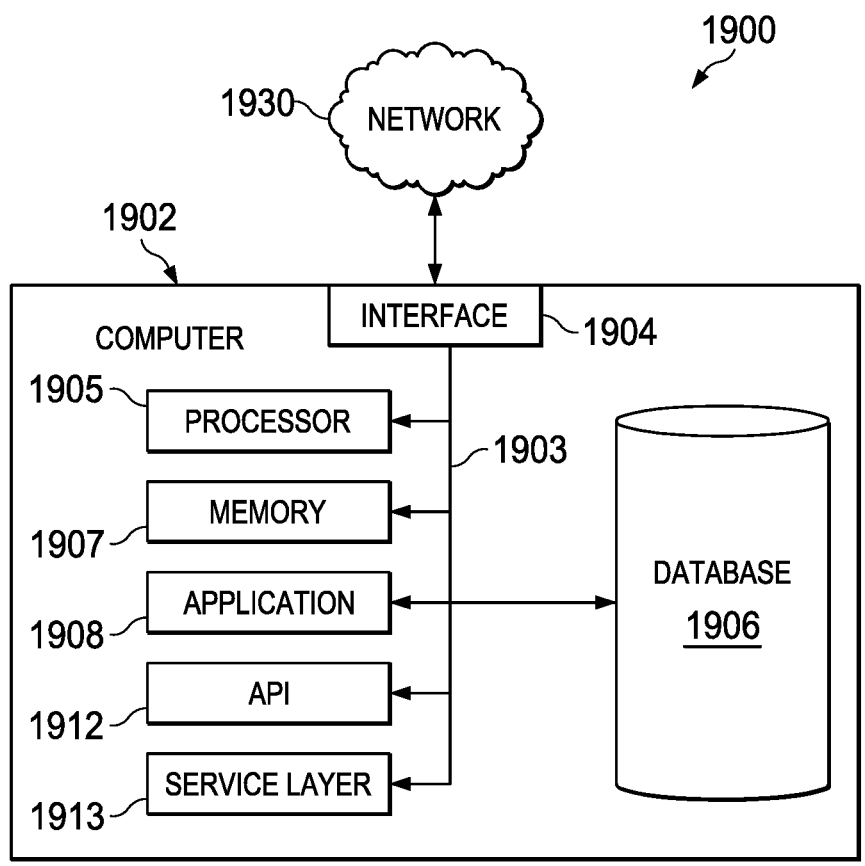
FIG. 19 is a block diagram illustrating an exemplary computer system used to provide computational functionalities associated with described algorithms, methods, functions, processes, flows, and procedures as described in the instant disclosure, according to an implementation.

FIG. 19 is a block diagram of an example computer system 1900 used to provide computational functionalities associated with described algorithms, methods, functions, processes, flows, and procedures, as described in the instant disclosure, according to an implementation. The illustrated computer 1902 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 1902 may comprise a computer that includes an input device, such as a keypad, keyboard, touch screen, or other device that can accept user information, and an output device that conveys information associated with the operation of the computer 1902, including digital data, visual, or audio information (or a combination of information), or a graphical user interface (GUI).

The computer 1902 can serve in a role as a client, network component, a server, a database or other persistency, or any other component (or a combination of roles) of a computer system for performing the subject matter described in the instant disclosure. The illustrated computer 1902 is communicably coupled with a network 1930 (for example, any computer network described with respect to the instant subject matter). In some implementations, one or more components of the computer 1902 may be configured to operate within environments, including cloud-computing-based, local, global, or other environment (or a combination of environments).

At a high level, the computer 1902 is an electronic computing device operable to receive, transmit, process, store, or manage data and information associated with the described subject matter. According to some implementations, the computer 1902 may also include or be communicably coupled with an application server, e-mail server, web server, caching server, streaming data server, or other server (or a combination of servers).

The computer 1902 can receive requests over network 1930 from a client application (for example, executing on another computer 1902) and respond to the received requests by processing the received requests using an appropriate software application(s). In addition, requests may also be sent to the computer 1902 from internal users (for example, from a command console or by other appropriate access method), external or third-parties, other automated applications, as well as any other appropriate entities, individuals, systems, or computers.

Each of the components of the computer 1902 can communicate using a system bus 1903. In some implementations, any or all of the components of the computer 1902, hardware or software (or a combination of both hardware and software), may interface with each other or the interface 1904 (or a combination of both), over the system bus 1903 using an application programming interface (API) 1912 or a service layer 1913 (or a combination of the API 1912 and service layer 1913). The API 1912 may include specifications for routines, data structures, and object classes. The API 1912 may be either computer-language independent or dependent and refer to a complete interface, a single function, or even a set of APIs. The service layer 1913 provides software services to the computer 1902 or other components (whether or not illustrated) that are communicably coupled to the computer 1902. The functionality of the computer 1902 may be accessible for all service consumers using this service layer. Software services, such as those provided by the service layer 1913, provide reusable, defined functionalities through a defined interface. For example, the interface may be software written in JAVA, C++, or other suitable language providing data in extensible markup language (XML) format or other suitable format. While illustrated as an integrated component of the computer 1902, alternative implementations may illustrate the API 1912 or the service layer 1913 as stand-alone components in relation to other components of the computer 1902 or other components (whether or not illustrated) that are communicably coupled to the computer 1902. Moreover, any or all parts of the API 1912 or the service layer 1913 may be implemented as child or sub-modules of another software module, enterprise application, or hardware module without departing from the scope of this disclosure.

The computer 1902 includes an interface 1904. Although illustrated as a single interface 1904 in FIG. 19, two or more interfaces 1904 may be used according to particular needs, desires, or particular implementations of the computer 1902. The interface 1904 is used by the computer 1902 for communicating with other systems that are connected to the network 1930 (whether illustrated or not) in a distributed environment. Generally, the interface 1904 comprises logic encoded in software or hardware (or a combination of software and hardware) and is operable to communicate with the network 1930. More specifically, the interface 1904 may comprise software supporting one or more communication protocols associated with communications such that the network 1930 or interface's hardware is operable to communicate physical signals within and outside of the illustrated computer 1902.

The computer 1902 includes a processor 1905. Although illustrated as a single processor 1905 in FIG. 19, two or more processors may be used according to particular needs, desires, or particular implementations of the computer 1902. Generally, the processor 1905 executes instructions and manipulates data to perform the operations of the computer 1902 and any algorithms, methods, functions, processes, flows, and procedures as described in the instant disclosure.

The computer 1902 also includes a database 1906 that can hold data for the computer 1902 or other components (or a combination of both) that can be connected to the network 1930 (whether illustrated or not). For example, database 1906 can be an in-memory, conventional, or other type of database storing data consistent with this disclosure. In some implementations, database 1906 can be a combination of two or more different database types (for example, a hybrid in-memory and conventional database) according to particular needs, desires, or particular implementations of the computer 1902 and the described functionality. Although illustrated as a single database 1906 in FIG. 19, two or more databases (of the same or combination of types) can be used according to particular needs, desires, or particular implementations of the computer 1902 and the described functionality. While database 1906 is illustrated as an integral component of the computer 1902, in alternative implementations, database 1906 can be external to the computer 1902.

The computer 1902 also includes a memory 1907 that can hold data for the computer 1902 or other components (or a combination of both) that can be connected to the network 1930 (whether illustrated or not). For example, memory 1907 can be random access memory (RAM), read-only memory (ROM), optical, magnetic, and the like, storing data consistent with this disclosure. In some implementations, memory 1907 can be a combination of two or more different types of memory (for example, a combination of RAM and magnetic storage) according to particular needs, desires, or particular implementations of the computer 1902 and the described functionality. Although illustrated as a single memory 1907 in FIG. 19, two or more memories 1907 (of the same or combination of types) can be used according to particular needs, desires, or particular implementations of the computer 1902 and the described functionality. While memory 1907 is illustrated as an integral component of the computer 1902, in alternative implementations, memory 1907 can be external to the computer 1902.

The application 1908 is an algorithmic software engine providing functionality according to particular needs, desires, or particular implementations of the computer 1902, particularly with respect to functionality described in this disclosure. For example, application 1908 can serve as one or more components, modules, or applications. Further, although illustrated as a single application 1908, the application 1908 may be implemented as multiple applications 1908 on the computer 1902. In addition, although illustrated as integral to the computer 1902, in alternative implementations, the application 1908 can be external to the computer 1902.

The computer 1902 can also include a power supply 1914. The power supply 1914 can include a rechargeable or non-rechargeable battery that can be configured to be either user- or non-user-replaceable. In some implementations, the power supply 1914 can include power-conversion or management circuits (including recharging, standby, or other power management functionality). In some implementations, the power-supply 1914 can include a power plug to allow the computer 1902 to be plugged into a wall socket or other power source to, for example, power the computer 1902 or recharge a rechargeable battery.

There may be any number of computers 1902 associated with, or external to, a computer system containing computer 1902, each computer 1902 communicating over network 1930. Further, the term "client," "user," and other appropriate terminology may be used interchangeably, as appropriate, without departing from the scope of this disclosure. Moreover, this disclosure contemplates that many users may use one computer 1902, or that one user may use multiple computers 1902.

Described implementations of the subject matter can include one or more features, alone or in combination.

For example, in a first implementation, a computer-implemented method includes generating a schema from a start IP address, a mask, and a desired level, the schema defining IPv4 addresses for nodes in the schema, the nodes representing addressable computer devices in an organization; computing, for each node and using the generated schema, an IP address, a mask, and a net; storing the schema; providing, for use in a user interface: information for presenting the schema, including information for displaying visualizations of groups of nodes in the schema; and instructions for listening for events based on user interactions that modify node information for nodes in the schema; receiving, in the user interface and generated from triggered events, information for modified nodes; and updating the stored schema using the information for the modified nodes.

The foregoing and other described implementations can each, optionally, include one or more of the following features:

In a first feature, combinable with any of the following features, one or more of the start IP address, the mask, and the desired level are received from a user or retrieved from a file.

In a second feature, combinable with any of the previous or following features, storing the schema includes storing the nodes in a tree structure with masks and nets that divide the nodes by one or more of geography, user group, and function.

In a third feature, combinable with any of the previous or following features, storing the schema includes storing the schema in a JavaScript Object Notation (JSON) file or in a spreadsheet.

In a fourth feature, combinable with any of the previous or following features, the user interactions include mouse touches, dragging, mouse clicks, and user inputs to change colors and labels.

In a fifth feature, combinable with any of the previous or following features, the computer-implemented method further comprises exporting the schema.

In a sixth feature, combinable with any of the previous or following features, format options for exporting the schema include scalable vector graphics (SVG), an image in portable network graphics (PNG) format, an updated JSON file, and a hypertext reference (href) tag with a download property.

In a second implementation, a non-transitory, computer-readable medium stores one or more instructions executable by a computer system to perform operations comprising generating a schema from a start IP address, a mask, and a desired level, the schema defining IPv4 addresses for nodes in the schema, the nodes representing addressable computer devices in an organization; computing, for each node and using the generated schema, an IP address, a mask, and a net; storing the schema; providing, for use in a user interface: information for presenting the schema, including information for displaying visualizations of groups of nodes in the schema; and instructions for listening for events based on user interactions that modify node information for nodes in the schema; receiving, in the user interface and generated from triggered events, information for modified nodes; and updating the stored schema using the information for the modified nodes.

The foregoing and other described implementations can each, optionally, include one or more of the following features:

In a first feature, combinable with any of the following features, one or more of the start IP address, the mask, and the desired level are received from a user or retrieved from a file.

In a second feature, combinable with any of the previous or following features, storing the schema includes storing the nodes in a tree structure with masks and nets that divide the nodes by one or more of geography, user group, and function.

In a third feature, combinable with any of the previous or following features, storing the schema includes storing the schema in a JavaScript Object Notation (JSON) file or in a spreadsheet.

In a fourth feature, combinable with any of the previous or following features, the user interactions include mouse touches, dragging, mouse clicks, and user inputs to change colors and labels.

In a fifth feature, combinable with any of the previous or following features, the operations further comprise exporting the schema.

In a sixth feature, combinable with any of the previous or following features, format options for exporting the schema include scalable vector graphics (SVG), an image in portable network graphics (PNG) format, an updated JSON file, and a hypertext reference (href) tag with a download property.

In a third implementation, a computer-implemented system comprises a computer memory and a hardware processor interoperably coupled with the computer memory and configured to perform operations comprising: generating a schema from a start IP address, a mask, and a desired level, the schema defining IPv4 addresses for nodes in the schema, the nodes representing addressable computer devices in an organization; computing, for each node and using the generated schema, an IP address, a mask, and a net; storing the schema; providing, for use in a user interface: information for presenting the schema, including information for displaying visualizations of groups of nodes in the schema; and instructions for listening for events based on user interactions that modify node information for nodes in the schema; receiving, in the user interface and generated from triggered events, information for modified nodes; and updating the stored schema using the information for the modified nodes.

The foregoing and other described implementations can each, optionally, include one or more of the following features:

In a first feature, combinable with any of the following features, one or more of the start IP address, the mask, and the desired level are received from a user or retrieved from a file.

In a second feature, combinable with any of the previous or following features, storing the schema includes storing the nodes in a tree structure with masks and nets that divide the nodes by one or more of geography, user group, and function.

In a third feature, combinable with any of the previous or following features, storing the schema includes storing the schema in a JavaScript Object Notation (JSON) file or in a spreadsheet.

In a fourth feature, combinable with any of the previous or following features, the user interactions include mouse touches, dragging, mouse clicks, and user inputs to change colors and labels.

In a fifth feature, combinable with any of the previous or following features, the operations further comprise exporting the schema.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include, special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
    generating a schema from a start Internet protocol (IP) address, a mask, and a desired level, the schema defining IPv4 addresses for nodes in the schema, the nodes representing addressable computer devices in an organization;
    computing, for each node and using the generated schema, an IP address, a mask, and a net, wherein a first byte of the IP address indicates a user group of the node, and a second byte of the IP address indicates a geographic territory of the node, and wherein the user group of the node is assigned based on a corresponding network functionality of the node;
    storing the schema;
    providing, for use in a user interface:
        information for presenting the schema, including information for displaying visualizations of groups of nodes in the schema; and
        instructions for listening for events based on user interactions that modify node information for nodes in the schema;
    receiving, in the user interface and generated from triggered events, information for modified nodes; and
    updating the stored schema using the information for the modified nodes.

2. The computer-implemented method of claim 1, wherein one or more of the start IP address, the mask, and the desired level are received from a user or retrieved from a file.

3. The computer-implemented method of claim 1, wherein storing the schema includes storing the nodes in a tree structure with masks and nets that divide the nodes by one or more of geography, user group, and function.

4. The computer-implemented method of claim 1, wherein storing the schema includes storing the schema in a JavaScript Object Notation (JSON) file or in a spreadsheet.

5. The computer-implemented method of claim 1, wherein the user interactions include mouse touches, dragging, mouse clicks, and user inputs to change colors and labels.

6. The computer-implemented method of claim 1, the computer-implemented method further comprising exporting the schema.

7. The computer-implemented method of claim 6, wherein format options for exporting the schema include scalable vector graphics (SVG), an image in portable network graphics (PNG) format, an updated JSON file, and a hypertext reference (href) tag with a download property.

8. A non-transitory, computer-readable medium storing one or more instructions executable by a computer system to perform operations comprising:
    generating a schema from a start Internet protocol (IP) address, a mask, and a desired level, the schema defining IPv4 addresses for nodes in the schema, the nodes representing addressable computer devices in an organization;
    computing, for each node and using the generated schema, an IP address, a mask, and a net, wherein a first byte of the IP address indicates a user group of the node, and a second byte of the IP address indicates a geographic territory of the node, and wherein the user group of the node is assigned based on a corresponding network functionality of the node;
    storing the schema;
    providing, for use in a user interface:
        information for presenting the schema, including information for displaying visualizations of groups of nodes in the schema; and
        instructions for listening for events based on user interactions that modify node information for nodes in the schema;
    receiving, in the user interface and generated from triggered events, information for modified nodes; and
    updating the stored schema using the information for the modified nodes.

9. The non-transitory, computer-readable medium of claim 8, wherein one or more of the start IP address, the mask, and the desired level are received from a user or retrieved from a file.

10. The non-transitory, computer-readable medium of claim 8, wherein storing the schema includes storing the nodes in a tree structure with masks and nets that divide the nodes by one or more of geography, user group, and function.

11. The non-transitory, computer-readable medium of claim 8, wherein storing the schema includes storing the schema in a JavaScript Object Notation (JSON) file or in a spreadsheet.

12. The non-transitory, computer-readable medium of claim 8, wherein the user interactions include mouse touches, dragging, mouse clicks, and user inputs to change colors and labels.

13. The non-transitory, computer-readable medium of claim 8, the operations further comprising exporting the schema.

14. The non-transitory, computer-readable medium of claim 8, wherein format options for exporting the schema include scalable vector graphics (SVG), an image in portable network graphics (PNG) format, an updated JSON file, and a hypertext reference (href) tag with a download property.

15. A computer-implemented system, comprising:
   a computer memory; and
   a hardware processor interoperably coupled with the computer memory and configured to perform operations comprising:
      generating a schema from a start Internet protocol (IP) address, a mask, and a desired level, the schema defining IPv4 addresses for nodes in the schema, the nodes representing addressable computer devices in an organization;
      computing, for each node and using the generated schema, an IP address, a mask, and a net, wherein a first byte of the IP address indicates a user group of the node, and a second byte of the IP address indicates a geographic territory of the node, and wherein the user group of the node is assigned based on a corresponding network functionality of the node;
      storing the schema;
      providing, for use in a user interface:
         information for presenting the schema, including information for displaying visualizations of groups of nodes in the schema; and
         instructions for listening for events based on user interactions that modify node information for nodes in the schema;
      receiving, in the user interface and generated from triggered events, information for modified nodes; and
      updating the stored schema using the information for the modified nodes.

16. The computer-implemented system of claim 15, wherein one or more of the start IP address, the mask, and the desired level are received from a user or retrieved from a file.

17. The computer-implemented system of claim 15, wherein storing the schema includes storing the nodes in a tree structure with masks and nets that divide the nodes by one or more of geography, user group, and function.

18. The computer-implemented system of claim 15, wherein storing the schema includes storing the schema in a JavaScript Object Notation (JSON) file or in a spreadsheet.

19. The computer-implemented system of claim 15, wherein the user interactions include mouse touches, dragging, mouse clicks, and user inputs to change colors and labels.

20. The computer-implemented system of claim 15, the operations further comprising exporting the schema.

* * * * *